US012788535B2

(12) United States Patent
Liston et al.

(10) Patent No.: US 12,788,535 B2
(45) **Date of Patent: *Nov. 10, 2026**

(54) OMNI-ABUTMENT AND METHODS OF USE

(71) Applicant: ESTHETIC IMPLANT SOLUTIONS, LLC, Bountiful, UT (US)

(72) Inventors: Todd C. Liston, Pleasant View, UT (US); Mark H. Blaisdell, Bountiful, UT (US)

(73) Assignee: Esthetic Implant Solutions, LLC, Bountiful, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/575,544

(22) Filed: Mar. 23, 2026

(65) Prior Publication Data

US 2026/0215891 A1 Jul. 30, 2026

Related U.S. Application Data

(63) Continuation-in-part of application No. 19/364,736, filed on Oct. 21, 2025, and a continuation-in-part of application No. PCT/US2025/020616, filed on Mar. 20, 2025, and a continuation-in-part of application (Continued)

(51) Int. Cl.
*A61C 8/00* (2006.01)
*A61C 9/00* (2006.01)

(52) U.S. Cl.
CPC ............ *A61C 8/005* (2013.01); *A61C 9/0053* (2013.01)

(58) Field of Classification Search
CPC ............................................ A61C 8/00–0098
See application file for complete search history.

(56) References Cited

U.S. PATENT DOCUMENTS

| | | | |
|---|---|---|---|
| 5,810,592 | A | 9/1998 | Daftary |
| 8,628,327 | B1 | 1/2014 | Blaisdell et al. |
| 9,572,640 | B2 | 2/2017 | Blaisdell et al. |

(Continued)

OTHER PUBLICATIONS https://www.3devo.com/blog/guide-to-3d-printing-polymers-and-materials, 3devo, Apr. 19, 2024, all (Year: 2024).

(Continued)

*Primary Examiner* — Yogesh P Patel
(74) *Attorney, Agent, or Firm* — Workman Nydegger

(57) ABSTRACT

An omni-abutment includes (i) an apical connection portion that mates/attaches with the receiving portion on a corresponding implant; and (ii) a coronal superstructure. The dental abutment provides features that are not currently found in abutments on the market, allowing the abutment to be used as a key foundation for scanning, impression taking, stability testing, and much more which ultimately would lead to an easier restorative process and fabrication of a dental prosthesis. The abutment could also be used for fabrication of a final prosthesis. The abutment may include alignment indents or protrusions in a platform thereof, internal grooves (e.g., square or rounded) as a tri-lobe or other configuration in the central axial hollow channel, recesses (e.g., divots, grooves) in the exterior periphery for increased adhesion to a gingival healing cuff, internal threading in the hollow channel, and a hex, NC or other connection at the apical connection portion.

50 Claims, 20 Drawing Sheets

Related U.S. Application Data

No. 19/060,102, filed on Feb. 21, 2025, now Pat. No. 12,582,508.

(60) Provisional application No. 63/710,443, filed on Oct. 22, 2024, provisional application No. 63/567,706, filed on Mar. 20, 2024, provisional application No. 63/557,379, filed on Feb. 23, 2024.

(56) References Cited

U.S. PATENT DOCUMENTS

| | | | | |
|---|---|---|---|---|
| 9,895,209 | B2 | 2/2018 | Blaisdell et al. | |
| 10,016,260 | B2 | 7/2018 | Blaisdell et al. | |
| 10,159,545 | B2 | 12/2018 | Thoméet al. | |
| 10,470,856 | B2 | 11/2019 | Liston et al. | |
| 10,507,081 | B2 | 12/2019 | Blaisdell et al. | |
| 10,568,720 | B2 | 2/2020 | Liston et al. | |
| 10,595,969 | B2 | 3/2020 | Liston et al. | |
| 10,595,970 | B2 | 3/2020 | Liston et al. | |
| 10,687,922 | B2 | 6/2020 | Blaisdell et al. | |
| 10,695,152 | B2 | 6/2020 | Liston et al. | |
| 10,709,525 | B2 | 7/2020 | Liston et al. | |
| 11,253,345 | B2 | 2/2022 | Liston et al. | |
| 11,478,339 | B2 | 10/2022 | Liston et al. | |
| 11,559,379 | B2 | 1/2023 | Liston et al. | |
| 11,571,283 | B2 | 2/2023 | Liston et al. | |
| 12,245,916 | B2 | 3/2025 | Liston et al. | |
| 2005/0136379 | A1* | 6/2005 | Niznick | A61C 8/0001 433/173 |
| 2005/0265522 | A1 | 12/2005 | Manley | |
| 2005/0287496 | A1 | 12/2005 | Niznick | |
| 2005/0287497 | A1 | 12/2005 | Carter | |
| 2006/0019216 | A1 | 1/2006 | Priluck et al. | |
| 2008/0166680 | A1 | 7/2008 | Kast et al. | |
| 2008/0206709 | A1 | 8/2008 | Lannan | |
| 2009/0305191 | A1* | 12/2009 | Jandali | A61C 8/0089 433/174 |
| 2012/0214130 | A1* | 8/2012 | Krivoruk | A61C 13/0001 433/173 |
| 2012/0282572 | A1 | 11/2012 | Macleod et al. | |
| 2012/0295226 | A1* | 11/2012 | Robb | A61C 13/0001 433/201.1 |
| 2013/0101964 | A1 | 4/2013 | Fudim | |
| 2013/0177872 | A1 | 7/2013 | Blaisdell et al. | |
| 2014/0205969 | A1* | 7/2014 | Marlin | A61B 6/032 433/196 |
| 2014/0319713 | A1 | 10/2014 | Blaisdell et al. | |
| 2015/0004563 | A1 | 1/2015 | Blaisdell et al. | |
| 2015/0104756 | A1 | 4/2015 | Robb et al. | |
| 2015/0327958 | A1 | 11/2015 | Llop et al. | |
| 2016/0256203 | A1 | 9/2016 | Gephart | |
| 2018/0325631 | A1 | 11/2018 | Christiansen et al. | |
| 2018/0338735 | A1 | 11/2018 | Kim et al. | |
| 2020/0375705 | A1 | 12/2020 | Suttin et al. | |
| 2021/0228322 | A1 | 7/2021 | Finelle | |
| 2021/0307883 | A1 | 10/2021 | Liston et al. | |
| 2022/0151742 | A1 | 5/2022 | Liston et al. | |
| 2022/0249206 | A1 | 8/2022 | Liston et al. | |
| 2023/0126119 | A1 | 4/2023 | Koski | |
| 2023/0381067 | A1 | 11/2023 | Smith | |
| 2025/0268694 | A1 | 8/2025 | Liston et al. | |
| 2026/0108327 | A1 | 4/2026 | Liston et al. | |

OTHER PUBLICATIONS

International Search Report and Written Opinion for application No. PCT/US2025/016978 dated Apr. 17, 2025.

International Search Report and Written Opinion for application No. PCT/US2025/051999 dated Jan. 8, 2026.

Non-Final Rejection Mailed on Jun. 17, 2025 for U.S. Appl. No. 19/060,102, 9 page(s).

Notice of Allowance and Fees Due (PTOL-85) Mailed on Nov. 28, 2025 for U.S. Appl. No. 19/060,102, 9 page(s).

* cited by examiner

OMNI-ABUTMENT AND METHODS OF USE

CROSS-REFERENCE TO RELATED APPLICATIONS

This application is a continuation-in-part under 35 USC 120 of U.S. patent application Ser. No. 19/060,102, filed Feb. 21, 2025, and titled "OMNI-ABUTMENT CORE AND METHODS OF USE," which issued as U.S. Pat. No. 12,582,508, which claims priority to and the benefit of U.S. Provisional Patent Application Ser. No. 63/557,379, filed Feb. 23, 2024, and titled "OMNI-ABUTMENT CORE AND METHODS OF USE," and Provisional Patent Application Ser. No. 63/710,443, filed Oct. 22, 2024, titled "3D PRINTED OR OTHER ANATOMICAL AND CIRCULAR GINGIVAL CUFFS", and Provisional Patent Application Ser. No. 63/567,706, filed Mar. 20, 2024, titled "CT SCANNING OF INTRAORAL SOFT TISSUE AND DENTAL STRUCTURES", each of which is herein incorporated by reference in its entirety. This application is also a continuation-in-part under 35 USC 120 of U.S. patent application Ser. No. 19/364,736, filed Oct. 21, 2025, and titled "3D PRINTED OR OTHER ANATOMICAL AND CIRCULAR GINGIVAL CUFFS FOR USE WITH ABUTMENTS," and a continuation-in-part under 35 USC 120 of PCT Patent Application Serial No. PCT/US2025/020616, filed Mar. 20, 2025, and titled "CT SCANNING OF INTRAORAL SOFT TISSUE AND DENTAL STRUCTURES".

Each of U.S. Pat. Nos. 8,628,327; 9,572,640; 9,895,209; 10,016,260; 10,687,922; 10,470,856; 10,595,969; 10,695,152; 10,507,081; 10,709,525; 11,253,345; 11,478,339; 10,595,970; 11,571,283; 10,568,720; and 11,559,379 and U.S. Publication Nos. 2022/0151742 and 2022/0249206, is each herein incorporated by reference in its entirety.

BACKGROUND OF THE INVENTION

1. The Field of the Invention

The present invention is in the field of dental abutments.

2. The Relevant Technology

While a variety of dental abutments are available within the art, including some configurations provided by applicant, there is still a continuing need for improved abutments that would provide additional features and functionality that is not currently available.

SUMMARY

An exemplary omni-abutment according to the present disclosure may include (i) an apical connection portion that would mate/attach with the receiving portion on a corresponding implant; and (ii) a coronal superstructure connection portion that serves as a core for attachment of a gingival healing cuff, where the coronal superstructure connection portion is connected to the apical connection portion either as one homogenous, seamless single piece of material or different biocompatible materials.

In an embodiment, at least a portion (e.g., the coronal superstructure) of the omni-abutment includes an irregular ovoid transverse cross-section, and/or a tri-lobe interior and/or exterior structure. In any case, the selected exterior configuration is not fully symmetrical, but is irregular in shape, which allows scanning of such structure in a way that allows the practitioner to determine orientation with certainty. For example, the abutment is not simply a hollow cylinder, as it is impossible to determine orientation of an abutment with such an exterior surface.

Also described is an omni-abutment and gingival healing cuff system, comprising an omni-abutment as described herein, and a gingival healing cuff that fits over the omni-abutment, wherein the gingival healing cuff may include corresponding structure for receipt of the exterior profile structure of the omni-abutment, so as to mate the two together in a keyed arrangement (e.g., rotation is not possible one relative to the other, once keyed). The gingival healing cuff may include internal retention features configured to provide bonding of the omni-abutment and the gingival healing cuff together in a rigid or semirigid fashion. For example, there is a need for retention features in the inner surface of the gingival healing cuff for adherence of bonding material between the cuff and the omni-abutment. Such retention features can also aid in overcoming polymerization shrinkage of composite and similar materials, upon curing. As will be apparent, there may be times when a rigid bond would be advantageous and others when a semi-rigid bond would be more desirable. For example, some embodiments employ a flowable composite material that fixes the gingival healing cuff to the omni-abutment with a very rigid connection. Alternatively, it may be desirable to use a semi-rigid bonding material that would not provide a fully rigid connection, but would allow the gingival cuff to be bonded to the omni-abutment in such a fashion as to allow the gingival healing cuff or an attached provisional crown (e.g., made from the gingival healing cuff), to have some mobility during oral function. This could potentially lessen the direct load on the implant during healing and other phases, absorbing some stresses within the bonding material itself. For example, such a bonding material may have some degree of elasticity (e.g., at least 3%, 5% or 10% elasticity). This could also apply to seating of a final crown on the omni-abutment or any other abutment.

In any of the described embodiments, the system may include a plurality of available gingival healing cuffs, each with a different size or configuration, wherein each cuff includes a hollow opening at a center portion of the gingival healing cuff, for receipt of the exterior profile structure of the omni-abutment. In an embodiment, the hollow opening in each gingival healing cuff is identically sized. In another embodiment, the hollow openings can be of different sizes, e.g., on cuffs that are of different shapes so they could fit over the abutments if they were of different diameters. By way of example, some commercially available implant screw heads are of different diameters. Differently sized hollow openings may be provided within a plurality of gingival healing cuffs to accommodate such.

In any of the described embodiments, the system may include a plurality of available gingival healing cuffs, the cuffs being available as circular or anatomically shaped. Such cuffs may be available in different sizes and can be customized chairside with dental materials to form a custom gingival healing cuff, custom provisional prosthesis, custom impression post and/or custom scan body.

In any of the described embodiments, the system may further comprise at least one of a buccal or lingual handle portion extending from the gingival healing cuff. In another embodiment, no handle(s) are provided. In an embodiment, indicia may be provided on the handle portion or elsewhere on the cuff, identifying a tooth position or shape or size or orientation of the gingival healing cuff. In an embodiment, the gingival healing cuff may further include a rectangular box or other timing alignment structure, e.g., positioned apical to the buccal alignment body, or at another appropriate location on the buccal surface. In an embodiment, the timing alignment structure may be configured to be recessed and/or protruded from the peripheral face of the gingival healing cuff, wherein the structure allows for determination of orientation of the implant platform relative to the abutment platform and/or gingival tissue. In an embodiment, the buccal or lingual handle portion may include a portion of reduced cross-sectional thickness adjacent a proximal end of the buccal or lingual handle portion, to facilitate break away by a practitioner once the buccal or lingual handle portion is no longer needed. Such handle (indeed the entire gingival healing cuff) may be formed from a polymeric material, which is easily broken off under applied finger pressure.

In any of the described embodiments, an irregular ovoid transverse cross-section may be provided along an exterior periphery of the coronal superstructure connection portion of the omni-abutment. In an embodiment, the irregular ovoid transverse cross-section may include relatively shorter buccal and lingual faces, and relatively longer mesial and distal faces, wherein the mesial and distal faces include a truncated flattened exterior surface to accommodate use of the omni-abutment in all tooth positions, including the smallest of lower incisor tooth positions of a given patient.

In any of the described embodiments, the platform and collar between the apical connection portion and the coronal superstructure connection portion may be anatomically shaped, generally ovoid shaped, or generally circular in shape.

In any of the described embodiments, one or more alignment indents or one or more alignment protrusions may be provided in a coronal top surface of the platform configured for use in CT or other scanning, or for use in verification of rotational timing, implant position, and/or identification of an employed implant system. By way of further example, markers on the outer surface and/or inner coronal surface of the omni-abutment could identify the implant system that the omni-abutment is made to mate with. Some examples of such may include different indents or protruding platform markers in a certain sequence or spacing. The same could be said for the trilobe or other structures inside of the hollow channel wall or on the exterior of the superstructure.

In any of the described embodiments, at least one of the provided gingival healing cuffs may include a series of recessed dots or other markers in an exterior periphery of the gingival healing cuff, aligned with a lobe in the hollow opening of the gingival healing cuff. In another embodiment, no such dots or markers are provided. Such markers may similarly be provided in the omni-abutment, as well.

In any of the described embodiments, recessed portions formed in the coronal superstructure connection portion may include one or more divots, and/or run both axially and longitudinally around the exterior periphery of the coronal superstructure connection portion of the omni-abutment. In an embodiment such divots may include or may be formed to a provide a marker with increased visibility (e.g., greater radiolucency or radiopacity) during scanning. In an embodiment, the divots may be configured as circles, triangles, boxes, or other shapes. In an embodiment, the divots may include a combination of different shapes, positioned so as to further aid in verifying orientation when scanning.

In any of the described embodiments, the coronal superstructure connection portion and the apical connection portion may be one homogenous single piece of material, or may be two or more pieces, formed of different biocompatible materials.

In any of the described embodiments, the omni-abutment may include something of a tri-lobe structure, either in a hollow axial channel of the coronal superstructure connection portion, or in the exterior periphery of at least the coronal superstructure connection portion. Such a tri-lobe structure may comprise three radially extending protrusions or indentations or grooves, each provided about 120° apart, running axially, either within the hollow axial channel of the coronal superstructure connection portion (for an internal tri-lobe) or along an exterior periphery of the omni-abutment (for an external tri-lobe). In another embodiment, the lobes may be unevenly distributed, with two such lobes being closer together than the third lobe (the lobe may be a protrusion or indentation/groove). In another embodiment more or less than 3 of such protrusions or indentations may be provided (e.g., providing something other than a tri-lobed structure such as exhibiting more than 3 such lobes, such as 4 lobes, 5 lobes, 6 lobes, or some other number). In a particular embodiment, the exterior periphery may not have a tri-lobe configuration, but may be generally ovoid in shape, but the hollow axial channel of the coronal superstructure connection portion may include a tri-lobe configuration, where the angle between such lobes may not be uniformly 120° (e.g., two of the lobes may be closer together than the 3rd lobe).

In any of the described embodiments, the omni-abutment can include a central axial hollow portion or channel, e.g., wherein the hollow portion or channel may include a tri-lobe or other lobed configuration in a coronal top portion of the omni-abutment.

In any of the described embodiments, the omni-abutment can include one or more recessed portions or grooves (e.g., vertical grooves and/or horizontal grooves) or indentations in an exterior periphery of the coronal superstructure connection portion of the omni-abutment, for reception of a composite or other curable material for adhering the omni-abutment to an associated gingival healing cuff. Such structures may aid in retaining the gingival healing cuff in place.

In any of the described embodiments, the abutment can be formed of a material that is transparent to UV or other curing light wavelengths, such that UV or other curing light directed into the hollow axial channel of the omni-abutment passes through portions of the adjacent wall to assist in curing composite or other curable materials used to connect a gingival healing cuff or other device to the abutment.

In any of the described embodiments, even if the abutment is not formed of a material that is transparent to UV or other curing light wavelengths (e.g., such as titanium, zirconium, titania, zirconia, etc.), UV or other light curing of a given composite or other desired curable material used for bonding two structures together (e.g., the abutment and a cuff) may still be possible by providing perforations through such abutment, to allow transmission of UV or other curing light wavelengths therethrough.

Furthermore, Applicant has found, somewhat surprisingly, that it is possible to cure a composite used to adhere the two structures (the abutment and the gingival healing cuff) together simply by directing the curing light to the structures to be adhered, from an exterior of the assembly, without significant problems. Nevertheless, the above described features could be provided, where curing may otherwise be incomplete without such features.

In any of the described embodiments, the omni-abutment may include an abutment platform upon which the gingival healing cuff sits and mates with the platform (e.g., with any irregular features included within such platform).

In any of the described embodiments, a collar may be provided under the platform, between the apical connection portion and the platform. Such a collar may provide various features, including irregular surface features that are helpful in determining orientation when scanning, aiding with seating of a retention screw that engages in the implant, surface structure that allows for bone and/or soft tissue attachment, and/or verification of the seating of the abutment into the implant.

In any of the described embodiments, any included platform may include a platform marker (e.g., a protrusion or recess) that assists in verification of the correct seating of the gingival healing cuff on the platform. Such structure can also aid in scanning (providing an additional irregularity), and may provide additional retention to the gingival healing cuff.

In any of the described embodiments, vertical and/or horizontal grooves and/or round, circular or other shaped indentations may be provided in the coronal superstructure connection portion, to aid in retention of the gingival healing cuff, as well as provide additional irregularities for scanning, to better determine orientation.

In any of the described embodiments, generally axial or vertically extending indentations or recesses may be provided, e.g., running along the exterior peripheral surface of the collar, to assist in verification of the seating of the abutment into the implant and orientation of the abutment with the implant. Such structures also aid in scanning, and also assist in verification of proper seating of the gingival healing cuff.

In any of the described embodiments, vertical grooves may be provided in the hollow axial channel in the interior portion of the coronal superstructure connection portion (e.g., which may have a tri-lobe configuration). Such grooves assist in seating of items that may be helpful during scanning (e.g., receipt of a scanning body, or when taking an impression (e.g., an impression post or impression analog), or verification of implant stability (e.g., torque wrench, percussion insert for percussion testing of stability, or the like).

In any of the described embodiments, the inner surface of the coronal superstructure connection portion may be internally threaded to allow for increased secure seating of any such items (e.g., scanning bodies, impression posts or analogs, torque wrenches, percussion inserts, or the like). Another possible mechanism for securing of such an item would be a configuration in which the insert (e.g., scanning bodies, impression posts or analogs, torque wrenches, percussion inserts, or the like) may be secured into the threading or other connection of the dental implant itself. For example, one could remove the retaining screw that couples the abutment into the implant, and insert the desired insert into the top of the abutment, where such insert could include threading or other coupling mechanism, that allows the insert to couple directly into the dental implant itself (the dental implant underlying the abutment).

In any of the described embodiments, retention grooves could be provided in the interior tri-lobe or similar grooved configuration to assist in secure seating and verification of the seating of mating portions of a coronal scanning body or other item inserted into such tri-lobe receptacle. A détente mechanism may be provided where the inserting structure includes a mating protrusion, which is retained within such retention groove. Means may be provided for releasing such a détente mechanism, allowing removal of the inserted structure, once it is no longer needed.

In any of the described embodiments, the apical connection portion may include at least one of a hex connection, a Narrow CrossFit (NC) connection, or any other connection at the apical connection portion.

In any of the described embodiments, the omni-abutment may be straight, such that the apical connection portion and the coronal superstructure connection portion are oriented within the same longitudinal axis of the omni-abutment.

In other embodiments, the omni-abutment may be angled, such that the apical connection portion defines a longitudinal axis that differs from a longitudinal axis of the coronal superstructure connection portion.

In any of the described embodiments, indicia may be provided on any corresponding gingival cuff (e.g., on a handle portion of the cuff), identifying a tooth position or shape or size of the cuff (LPM=Lower PreMolar). Such indicia could also identify the implant system, e.g., Nobel Biocare NP, Straumann etc. Such indicia could also identify the length of the associated cuff, such as short or long or, in the case of round (e.g., circular) cuffs, such indicia could identify the corresponding diameter, e.g., 5 mm, 6 mm, or the like. Such indicia could note the corresponding anatomic orientation (e.g., "B" for buccal or "L" for lingual, where such indicia are placed.

In an embodiment, the gingival healing cuff may include a rectangular or other shaped box or recess positioned in the buccal face of the gingival healing cuff. For example, such an alignment or "rotational timing" aid may be positioned apically relative to any included buccal T-shaped handle or alignment structure. Such a rectangular box or other "rotational timing aid" may be helpful for alignment (particularly "rotational timing" alignment), especially once any initially included buccal T-shaped handle or alignment member is removed. Timing refers to the rotational orientation of the gingival healing cuff, e.g., relative to the abutment core, the underlying implant, and/or other adjacent structures, etc. Such a "rotational timing" alignment structure may also be helpful for ascertaining the depth of the abutment platform (which is hidden within the assembly), and the implant platform, which is of course also hidden, once such structures are installed. For example, the abutment platform may be on a central portion of the abutment and may abut the apical bottom portion of the gingival healing cuff, when the coronal portion of the abutment is received into the gingival healing cuff. Such a box or other timing alignment structure on the gingival healing cuff may provide a visual reference, to allow the practitioner to know the depth of such structures, within the surgical site. Without such a box or other timing alignment structure, many practitioners will have difficulty knowing how far up or down any given structures (e.g., the abutment platform and the implant platform) actually are. Such a box or other timing alignment structure may be a wide aspect ratio rectangle (e.g., a horizontally oriented rectangle, with the long side of such rectangle being generally horizontal), although other shapes or markers are of course also possible. Such a box or other marker may be positioned apically below the buccal handle or T-shaped alignment member. Such a buccal box or similar marker can also be helpful in scanning (e.g. digital, CT or other) to ensure proper orientation of the gingival healing cuff and abutment assembly with the underlying implant and surrounding anatomical structure.

In an embodiment, any buccal and lingual handle portions, which provide function as a handle in addition to alignment and other benefits, may be fabricated so as to easily snap off the adjacent portion of the gingival healing cuff, from which they extend. For example, because these structures may be 3D printed, with the gingival healing cuff as a single integral piece of material, it is possible to fabricate such with a narrowed or reduced, easily breakable cross-section adjacent the exterior face of the gingival healing cuff. Previously, e.g., when casting such structures, it was difficult if not impossible to include undercuts in such structures, as it interferes with release from the casting jig. Such an undercut, thinned cross-sectional region as shown in the accompanying figures is advantageous, as the alignment body is easily broken off, rather than requiring a more labor intensive option of cutting off the alignment body. For example, application of simple moderate finger pressure on the alignment body may be sufficient to cause it to break away, once its purpose is complete. Once broken away, the resulting surface (which may be rough) is easily smoothed away by a quick simple touch with a dental bur.

In any of the described embodiments, the gingival healing cuff may include one or more injection ports (e.g., small holes on mesial and/or distal ends of the gingival healing cuff). The practitioner may apply a drop of composite or other bonding material at one or more locations on the side(s) of the gingival healing cuff, and a drop of composite or other bonding material on the abutment. Providing such injection ports in the gingival healing cuff, allows one to inject composite or other bonding material, having it flow within and around the recessed portion(s) noted above, and flow out the other injection hole port. Ideally, placement of injection ports into the gingival healing cuff body better facilitates bonding of the abutment and gingival healing cuff together, e.g., by use of biocompatible injectable composite or other bonding material. Similar structure could be used for attaching a crown, cusp, bridge or other prosthetic over the gingival healing cuff body or directly to an abutment in the case of a final prosthesis. In addition, the use of injection ports as described herein makes the process of bonding the abutment and the gingival healing cuff easier than with other techniques. While injection ports are described as an example, in another embodiment, such "ports" could be configured as one or more surfaces or anatomical markers of the gingival healing cuff, for injection or other flow of a composite or other curable material for bonding the gingival healing cuff to the omni-abutment.

In any of the described embodiments, the variously described markers on internal and/or external areas of the abutment, in combination with the apical connection portion or other portions of the abutment can be configured to allow a practitioner to scan the assembled structure, with the gingival healing cuff seated on the abutment. Such scanning can be used to verify abutment alignment with the implant, and even accuracy of the scanner calibration. Such a verification scan could be used to identify models of scanners that may be particularly good, for recommendation to practitioners, as well as identification of available scanners that may not be particularly accurate. This would allow a manufacturer to recommend particularly good scanners, for use with the present systems.

For example, validation or verification of the accuracy of a given scanner may be achieved as follows. The exact size/dimensions of the omni-abutment are known from the CAD design. As such, when a full 720 degree scan of the custom scan body (including the omni-abutment and seated gingival healing cuff) is obtained, which captures the apical connection, the platform and its markers, the gingival healing cuff and its markers, and the coronal trilobe configuration and its markers, the resulting scan file can be overlayed with the CAD design of the omni-abutment to see if there is any distortion of the omni-abutment in the scanning process. This could be done for each specific custom scan body placement site. With the use of AI, this could more easily be accomplished. An exemplary work flow with a digital scanner could be:

(1) placement of the omni-abutment with the gingival healing cuff (referred to as a gum shaper) on the implant;
(2) customize the gum shaper if indicated;
(3) remove gum shaper handles and smooth over the handle areas;
(4) obtain a full 720 degree extraoral digital scan of the gum shaper;
(5) seat the gum shaper on the implant and allow the gum tissue to heal;
(6) once the implant is ready for restoration, a normal scanning sequence for fabrication of the final prosthesis using the gum shaper as the custom scan body is done;
(7) send the scans, including the 720 degree scan of the gum shaper to the dental laboratory for fabrication of the prosthesis;
(8) the dental laboratory designs the final prosthesis using appropriate design software or other available designing modality. During the design phase, the CAD of the omni-abutment used for the specific implant system can be overlayed with the scan of the gum shaper's omni-abutment for the same implant system to determine if any distortion or discrepancies of the scan exist, thus verifying the accuracy of the scan, the scanner and/or the scanning technique used by the dental office.

The omni-abutment can be adjusted by a practitioner as to its height or other aspect of its shape, for example, the abutment can be adjusted vertically and/or horizontally. For example, a practitioner may choose to cut off or otherwise shorten the abutment, e.g., by removing a portion of the top coronal portion of the abutment. By way of example, the abutment may typically have a height ranging from about 3 mm to about 11 mm. A typical height may be from 8 mm to 11 mm. Exemplary heights may include 3 mm, 4 mm, 5 mm, 6 mm, 7 mm, 8 mm, 9 mm, 10 mm, or 11 mm.

While a variety of omni-abutments, and systems employing such are described, it will be appreciated that a wide variety of methods of use are also contemplated, using such abutments and systems, as described herein.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures.

DETAILED DESCRIPTION OF THE PREFERRED EMBODIMENTS

I. Definitions

Figure 1A:
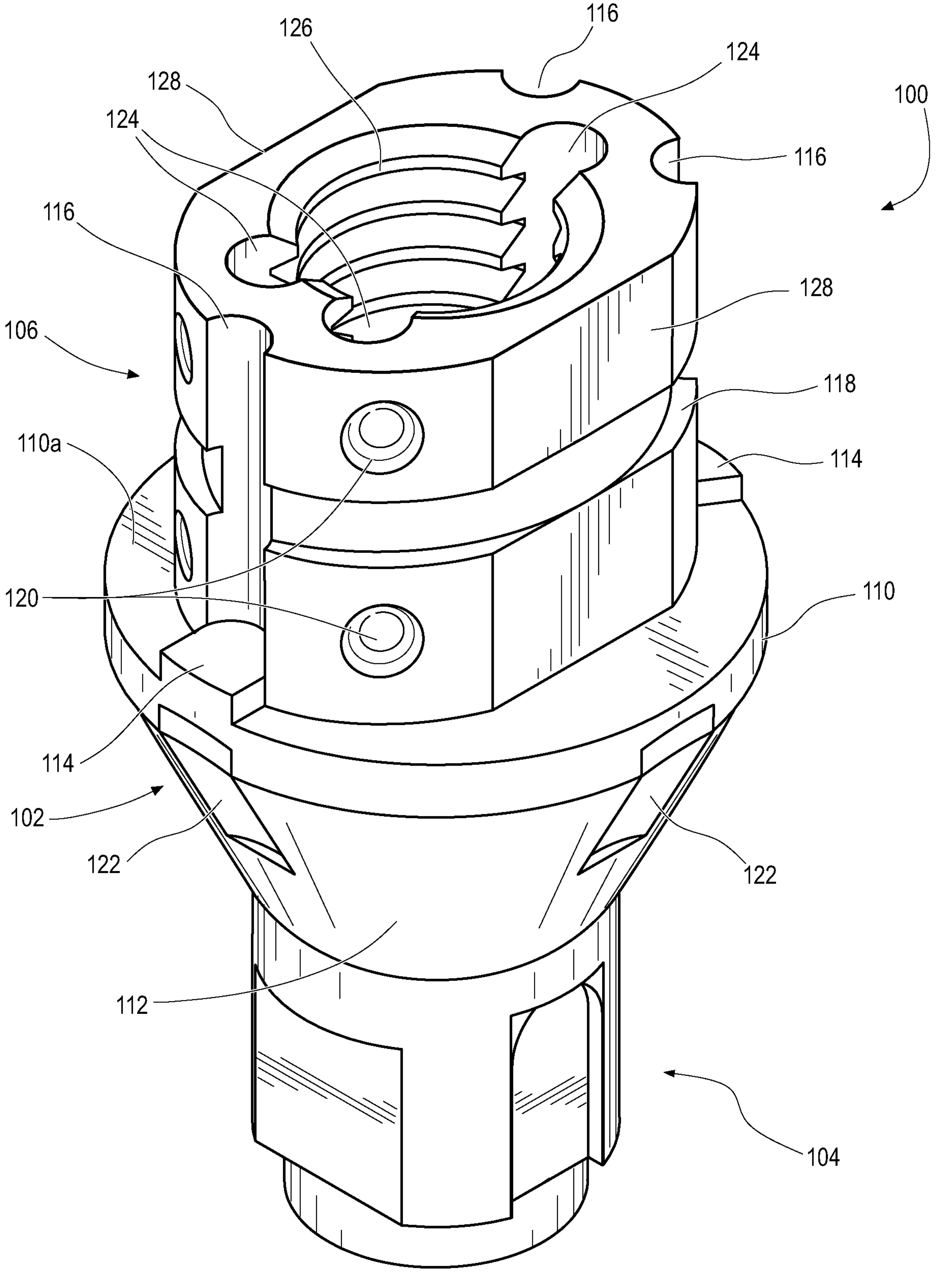
FIGS. 1A-1B illustrate a perspective and buccal front view of an exemplary omni-abutment according to an embodiment of the present disclosure.

Some ranges may be disclosed herein. Additional ranges may be defined between any values disclosed herein as being exemplary of a particular parameter. All such ranges are contemplated and within the scope of the present disclosure.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values for example thus include values that are within 20%, 10%, within 5%, within 1%, etc. of a stated value.

All numbers used in the specification and claims are to be understood as being modified in all instances by the term "about", unless otherwise indicated. The use of "about", "substantially" and the like may particularly include values within the above stated variance (e.g., within 20%, 10%, 5%, 1%). Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

It must be noted that, as used in this specification and the appended claims, the singular forms "a," "an" and "the" include plural referents unless the content clearly dictates otherwise.

Any directions or reference frames in the description are merely relative directions (or movements). For example, any references to "top", "bottom", "up" "down", "above", "below" or the like are merely descriptive of the relative position or movement of the related elements as shown, and it will be understood that these may change as the structure is rotated, moved, the perspective changes, etc.

All publications, patents and patent applications cited herein, whether supra or infra, are hereby incorporated by reference in their entirety to the same extent as if each individual publication, patent or patent application was specifically and individually indicated to be incorporated by reference.

II. Introduction

In one embodiment, the present invention is directed to an omni-abutment that includes (i) an apical connection portion that would mate/attach with the receiving portion on a corresponding implant; and (ii) a coronal superstructure connection portion that serves as a core for attachment of a gingival healing cuff and/or a final crown prosthesis, where the coronal superstructure connection portion is connected to the apical connection portion either as one homogenous single piece of material or provided as different biocompatible materials. While in an embodiment, the omni-abutment may be separate from the gingival healing cuff, in another embodiment, it will be appreciated that both structures could be formed as a single piece of seamless material (e.g., 3D printed from a resin material, machined, or otherwise manufactured). In an embodiment, at least the coronal superstructure connection portion of the omni-abutment may include an irregular ovoid transverse cross-section, and/or a tri-lobe interior and/or exterior structure, wherein a selected exterior configuration of the coronal superstructure is not fully symmetrical (e.g., not a simple cylinder, oval, or similar highly symmetrical structure, as it is difficult to determine orientation and position when scanning such structures). The present abutment is configured with a variety of irregularities in any otherwise generally uniform shape so as to allow digital scanning of such structure in a way that allows the practitioner to determine orientation relatively easily and with certainty.

A gingival healing cuff can also be provided. The cuff fits over the omni-abutment, wherein the gingival healing cuff may include a corresponding keyed configuration for receipt of the irregular ovoid, tri-lobe or other specific structure provided by the exterior periphery of the coronal superstructure connection portion of the omni-abutment. The various structures provided in the omni-abutment as shown in the Figures and described herein provide functionality not available in current systems. The term omni-abutment is used, as the present configurations provide far more functionality than provided within current abutments.

III. Exemplary Methods and Systems

Figure 1B:
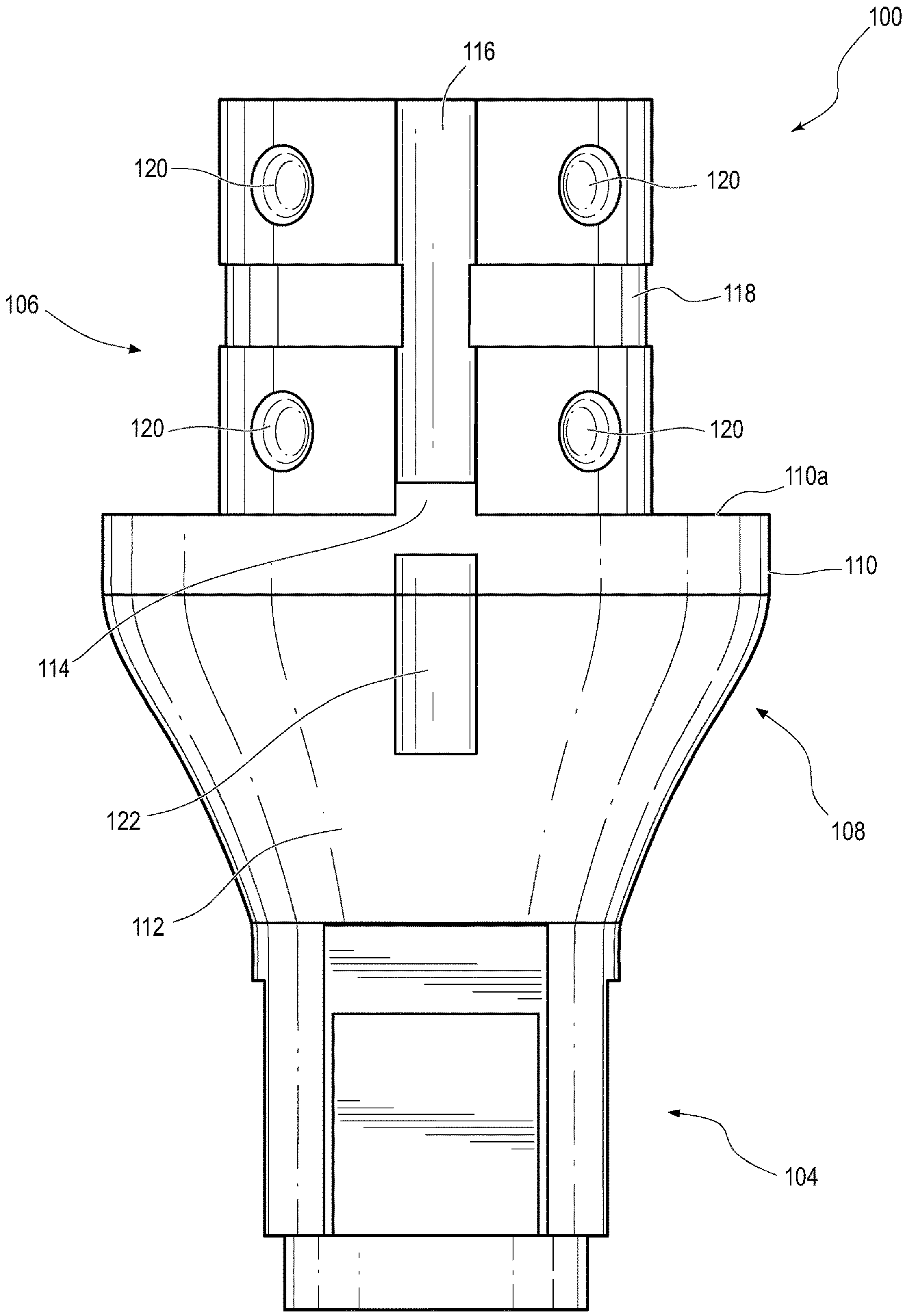

FIGS. 1A-1B illustrate an exemplary omni-abutment 100 provided as a single piece body 102, including an apical connection portion 104 and a coronal superstructure connection portion 106. As shown in FIG. 1B, an abutment superstructure 108 may include both coronal superstructure connection portion 106, as well as an abutment platform 110, and a collar 112. Apical connection portion 104 includes an indexed engaging connection that mates with a corresponding connection in a dental implant. The indexed engaging connection can be configured for any desired dental implant (e.g., any of the wide variety of commercially available dental implants, or otherwise). The connection at the apical connection portion 104 may be engaging (e.g., indexed keyed structure) or a non-engaging connection (which allows free rotation). An example of a non-engaging connection is round (e.g., circular) in cross-sectional shape, without any indexing. Other non-engaging geometries may also be possible. Implant abutments come in two types, engaging and non-engaging. Engaging can be used in any situation for restorative purposes. A non-engaging connection may be used when two or more implants are tied together with a prosthesis, e.g., bridge, denture, metal or zirconium structure. When they are tied together, they will not rotate, hence no indexing is necessary. The abutment superstructure 108 allows establishment of the gingival emergence profile, which ultimately shapes the gingival tissue from the implant connection to the crest of the gingival tissue. This superstructure 108 also includes many other advantageous substructures, as described herein, that allow for many additional functions.

Such functions may include the below features, as well as additional features described herein. For example, the features of the omni-abutment superstructure, alone or mated with a gingival healing cuff or other attachment, allow for determination of rotational "timing" and orientation of the abutment with the dental implant and surrounding oral tissues (hard and/or soft) for ultimate fabrication of a provisional or final dental prosthesis. This can either be done via scanning, direct visualization, x-ray, etc.

Another feature is that the coronal superstructure connection portion of the omni-abutment may extend to (e.g., flush with) or coronally out of the attached gingival healing cuff. The most superior surface of the superstructure connection portion may have identifying landmarks such as grooves and/or other markers that can be scanned or used with an analog impression to allow for determination of orientation of the abutment and/or associated gingival healing cuff with the surrounding oral anatomic structures for ultimate fabrication of a dental prosthesis. This is superficially similar to techniques being used by some practitioners, but significantly different in that it uses the omni-abutment as the scan body (no separate scanning body is required) and may include the gingival healing cuff. To Applicant's knowledge, no one else is using a "core" abutment for either scanning or analog impression purposes. Such features are described in items 12 and 13 of the Appendix of Provisional Application Ser. No. 63/557,379, filed Feb. 23, 2024, and titled "OMNI-ABUTMENT CORE AND METHODS OF USE, herein incorporated by reference in its entirety.

As another feature, ideally, the omni-abutment can be used as a provisional abutment with a gingival healing cuff. Also, it can be used as a final abutment for a final prosthesis. The exact same abutment can be used for both purposes, sequentially.

As another feature, the omni-abutment and gingival healing cuff or provisional/final prosthesis can be manufactured out of one homogenous seamless material, or as a combination of biocompatible materials.

As another feature, the apical connection portion may have a configuration that allows it to be scanned in a way that the practitioner can determine orientation with certainty, separate from or in addition to any structures that may provide similar functionality in the more coronal portions of the omni-abutment and/or gingival healing cuff, for determining orientation of the omni-abutment relative to surrounding oral anatomical structure and the implant, for fabrication of a prosthesis. The present omni-abutments and/or gingival healing cuffs may be used with a coronal and/or apical scanning body.

The abutment platform 110 includes a coronal top surface 110*a* on which the gingival healing cuff sits, and mates with platform 110. Platform also is shown as including additional features that assist in scanning (e.g., digital scanning, CT scanning, ultrasound, photogrammetry, or other image scanning) of the abutment 100 and a connected prosthesis.

Coronal superstructure connection portion 106 is a connection portion of the overall superstructure 108, which is important to several functions. For example, it provides a surface for retention and alignment of anatomic and/or non-anatomic healing cuffs, e.g., varieties of which are described in Patent Application Ser. No. 63/710,443, filed Oct. 22, 2024, titled "3D PRINTED OR OTHER ANATOMICAL AND CIRCULAR GINGIVAL CUFFS, herein incorporated by reference in its entirety. Of course other gingival healing cuffs may also be used.

Coronal superstructure connection portion 106 also provides surface features that are helpful in scanning (particularly in determining orientation and position), as well as seating of devices to test the stability of the underlying dental implant, and seating of devices used to take an analog impression, or to seat a scanning body. Such can also include seating of devices upon which a prosthesis (e.g., permanent or temporary) can be seated. Such a concept would bridge the gap between use of an engaging omni-abutment for single restorations, to allowing one to use non-engaging omni-abutments for bridges and dentures. Such a use may very well require a change in the configuration of the outer surface of the coronal superstructure connection portion of the omni-abutment, but the internal connection portion may very well remain the same.

Collar 112 is positioned between platform 110 and apical connection portion 104. The illustrated collar 112 is frustoconical in shape (i.e., a truncated cone, also known as a frustum). While a particular shape is shown, it will be appreciated that this collar and/or platform 110 may be anatomical or non-anatomical in shape. An anatomical shape may also be generally frustoconical in shape, with a similar generally conical taper, although with some variations in shape, to better approximate the actual anatomy where inserted and received. In addition, these structures can possess features that assist in scanning, seating of the retention screw that engages in the implant (attaching the abutment to the implant), and other features. For example, collar 112 may provide surface structure (e.g., texturing, or simply choice of materials) that facilitates bone and/or soft tissue attachment thereto. The collar 112 may also aid in verification of the seating (full seating) of the abutment into the implant.

As shown, platform 110 may include one or more platform markers 114 that are useful in assisting in verification of the correct seating of the gingival healing cuff on platform 110. The presence of such markers (shown as an upwardly extending protrusion in FIG. 1A) also aid in scanning of the abutment and an attached gingival healing cuff. As shown, one important feature of the illustrated protruding platform marker 114 is that an edge of such marker 114 is flush with the radial edge of platform 110, so that even when a gingival healing cuff is seated on platform 110, marker 114 will be visible, both by eye, and through scanning, even if gingival healing cuff is not radiographically transparent to whatever imaging system is employed in such scanning. This allows a practitioner to verify that the gingival healing cuff is in fact properly seated on platform 110, without any undesirable gap therebetween. Such a marker 114 may also aid in retaining the gingival healing cuff over the abutment 100, to prevent undesirable detachment, or rotation.

Coronal superstructure connection portion 106 is also shown as including one or more (e.g., 3 are illustrated) substantially vertical grooves or other recessed portions 116 in an exterior peripheral surface of the abutment. Such features aid in alignment and retention of the gingival healing cuff, as well as providing surfaces that detract from the regularity of the otherwise ovoid cross-sectional shape of the coronal connection portion 106, aiding in scanning of the abutment. Such grooves or other recessed portions may also serve for reception of a composite or other curable material for adhering the abutment to an associated gingival healing cuff. While recessed portions 116 are shown as substantially vertical, running axially, it will be appreciated that they could be provided at another angle, e.g., between vertical and horizontal (e.g., they could run at a diagonal angle such as within 45°, within 30° or within 10° of vertical, should such be desired). In addition, while 3 such grooves or recessed portions are shown, it will be appreciated that more or fewer could be provided.

In an embodiment, the illustrated unequal placement of the grooves or recessed portions 116 is advantageous, as the single groove located by itself may serve as an alignment marker, denoting the buccal face, while the two grooves or recessed portions 116 shown opposite the buccal groove or recess may denote the lingual face. It will be appreciated that other configurations are of course also possible.

Coronal superstructure connection portion 106 may also include one or more generally horizontal grooves or recessed portions 118, as shown. Such a horizontal groove or recessed portion provides similar functionality, aiding with retention of the gingival healing cuff to the abutment, as well as aiding with scanning of the abutment, as it also provides additional irregularity to the exterior surface. As with recessed portions 116, horizontal groove or other recessed portions 118 may serve for reception of a composite or other curable material for adhering the abutment to an associated gingival healing cuff. While recessed portion 118 is shown as substantially horizontal, running longitudinally around the exterior periphery of the coronal superstructure portion 106, it will be appreciated that it could be provided at another angle, e.g., between horizontal and vertical (e.g., it could run at a diagonal angle such as within 45°, within 30° or within 10° of horizontal, should such be desired). In addition, while a single such groove or recessed portion is shown, it will be appreciated that more such horizontal grooves could be provided.

FIGS. 1A-1B further illustrate the presence of one or more indentations 120 in the coronal superstructure portion 106 of abutment 100. Such indentations 120 may be rounded or circular in shape, as shown, or may be of another shape (e.g., square, rectangular, or other polygonal shaped). Any shape may be possible. Such indentations provide for improved retention of the gingival healing cuff as well as providing additional irregularities to the otherwise smooth exterior surface, which is helpful in determining orientation and position when scanning the abutment.

FIGS. 1A-1B also show the presence of a groove or recess 122 within the exterior surface of platform 110 and/or collar 112. It will be appreciated that such a structure could also or alternatively be a protrusion, or a combination of grooves and/or recesses with protrusions of various shapes and configurations. Any of such could be used to assist in verification of various steps as described herein. For example, such structures assist in verification of the seating of the abutment into the implant, and orientation of the abutment with the implant. Such features also aid with scanning of the abutment (as they provide another irregularity to the otherwise smooth exterior surface). Such structures 122 also serve to assist in verification of the proper seating of the gingival healing cuff. The illustrated abutment includes 4 such recesses 122, although more or fewer could be provided. The illustrated recesses 122 are evenly distributed about the abutment (e.g., 90° apart from one another). It will also be noted that in the illustrated embodiment, two of the recesses 122 are axially aligned with protruding platform markers 114.

As shown in FIG. 1A, abutment 100 may include indentations 124 in the interior hollow axial channel of the coronal superstructure connection portion 106 of abutment 100. Such interior indentations or grooves allow for seating of various items that assist with scanning, impression taking, and verification of implant stability (e.g., insertion of a scanning body, impression post, impression post analog, torque wrench, percussion torque testing instrument, or other torque test instrument). Such features may also be used for verifying proper seating of a device upon which a temporary or final prosthesis can be seated. The illustrated interior indentations may be considered to provide a tri-lobe interior structure configuration. As shown, in an embodiment, 3 lobes or indentations may be provided, unevenly distributed about the hollow axial channel of coronal superstructure portion 106. For example, one such lobe may be positioned centered between the two exterior peripheral vertical grooves or recessed portions 116 (on the lingual face), while the other exterior peripheral vertical groove or recessed portion 116 (on the buccal face) may be centered between the other two lobes 124, as shown. While lobes 124 are shown as rounded or generally circular, it will be appreciated that they may have a variety of other geometries (e.g., more squared, such as squared with radiused corners, or squared with angular corners, etc.).

Figure 4A:
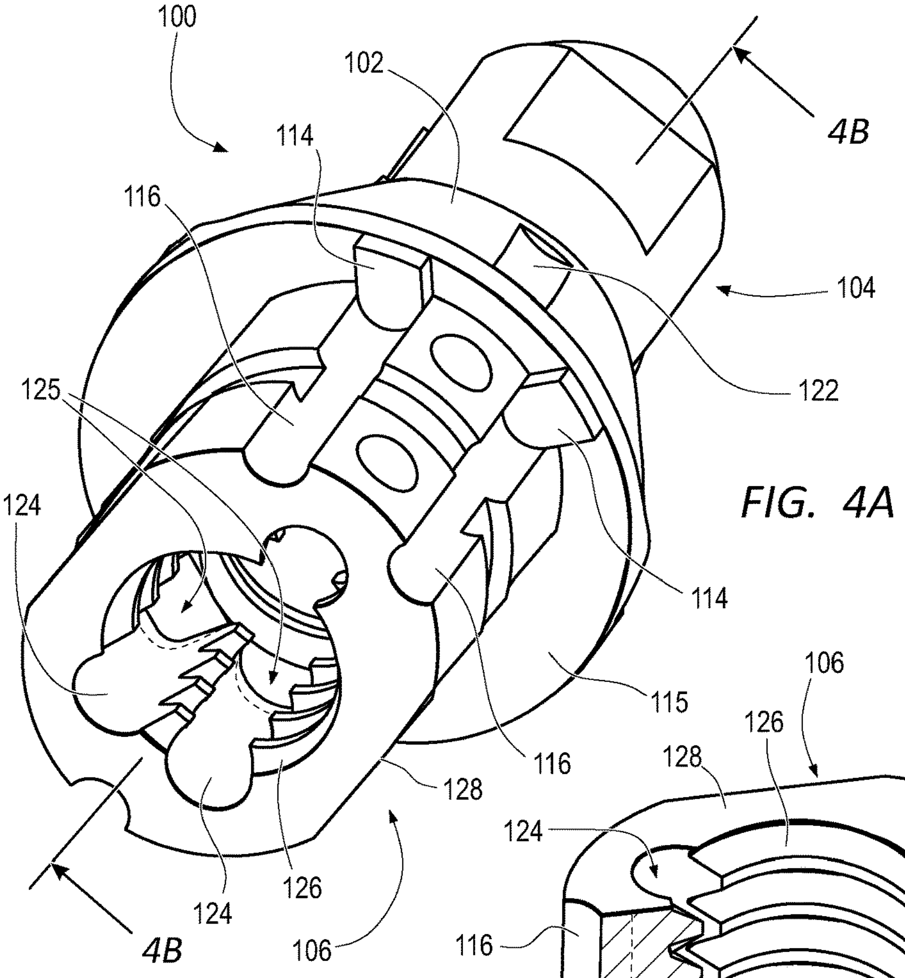
FIGS. 4A-4B illustrate a perspective view and a cross-sectional view of an omni-abutment similar to that of FIGS. 1A-1B, but including a retention groove 125 as an undercut within the vertical interior indentations 124, for additional retention or locking of a structure inserted into such indentations.
Figure 4B:
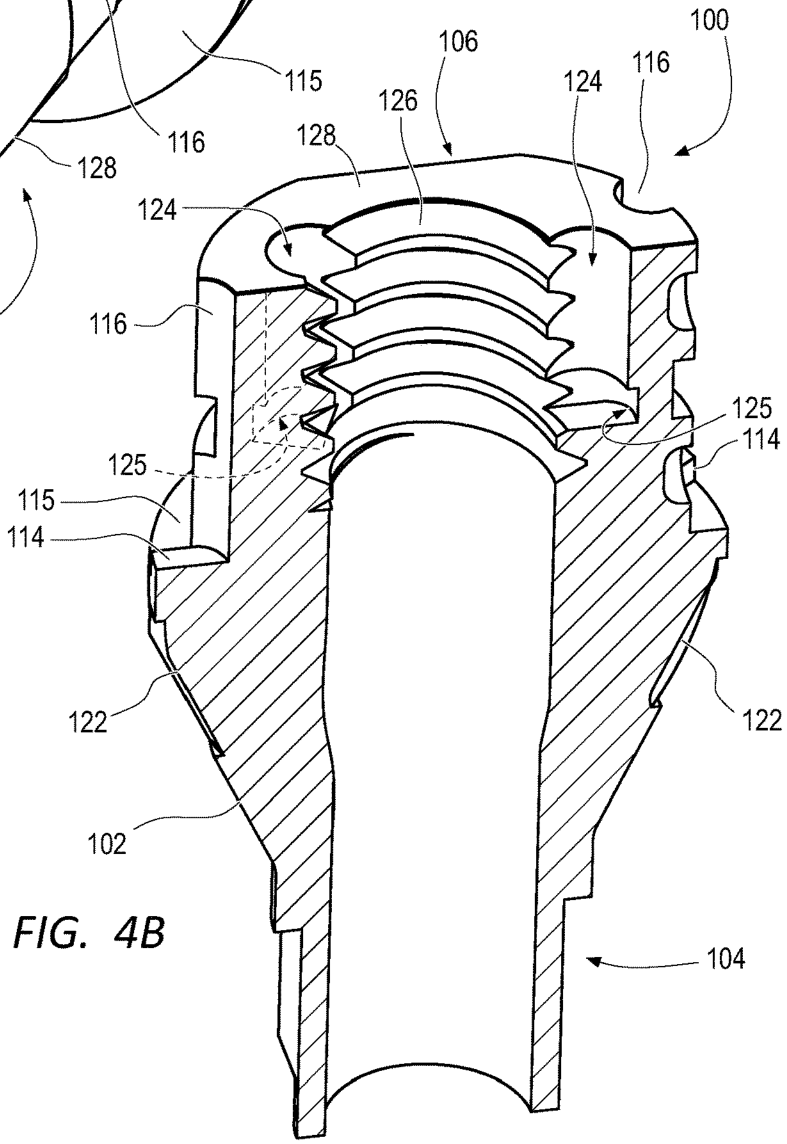

As shown, the substantially vertical indentations 124 may extend downward, within the hollow axial channel of coronal superstructure connection portion 106, e.g., to a depth that terminates at or before the top surface 110*a* of platform 110. The indentations may be arranged to provide a keyed configuration, to ensure that any structure inserted into the top end of the hollow axial channel of coronal superstructure portion 106 can only be inserted in a single orientation, and cannot rotate (i.e., is locked) once inserted. Each vertical indentation 124 could further include a retention groove or similar structure 125 (see FIGS. 4A-4B), to assist in secure seating and verification of the seating of the mating portions of a coronal scanning body or other item that may be placed into such grooves, channels, or the like. For example, a small indentation 125 may be present in a middle portion or another location within indentation 124, for such purpose. By way of example, a détente or other mating protrusion in the structure being seated may mate into, and be retained by such small indentation 125.

FIG. 1A also illustrates how the hollow axial channel of coronal superstructure portion 106 may be threaded, e.g., including threads 126 in such inner surface, allowing for increased secure seating of any items coupled or inserted into the top end of the hollow axial channel of the coronal superstructure portion 106. Such threading may extend only partially through the full height of the abutment, e.g., no further than the top surface 110*a* or platform 110. The hollow axial channel itself may extend through the entire length of the abutment, e.g., allowing insertion of a retention screw used to attach the apical connection portion 104 into a corresponding underlying dental implant. Another possible mechanism for securing an insertable insert tool (e.g., scanning bodies, impression posts or analogs, torque wrenches, percussion inserts, or the like) may employ the coupling mechanism within the underlying dental implant. For example, one could remove the retaining screw that couples the abutment into the implant, and insert the desired insert into the top of the abutment, where such insert could include threading or other coupling mechanism, that allows the insert to couple directly into the dental implant itself (the dental implant underlying the abutment).

The illustrated generally ovoid transverse cross-section of the coronal superstructure connection portion 106 is shown as including flattened surfaces 128 on such connection portion 106, which flattened faces allow for orientation and retention of the gingival healing cuff, as well as provide for improved scanning. Such flattened surfaces are shown positioned at the mesial and distal faces of the coronal superstructure connection portion of the abutment. Such flattening (reducing mesial-distal width) is also helpful in accommodating use of the same abutment in all tooth positions, including the smallest of the lower incisor tooth positions (which are the smallest teeth in a given patient).

Figure 2:
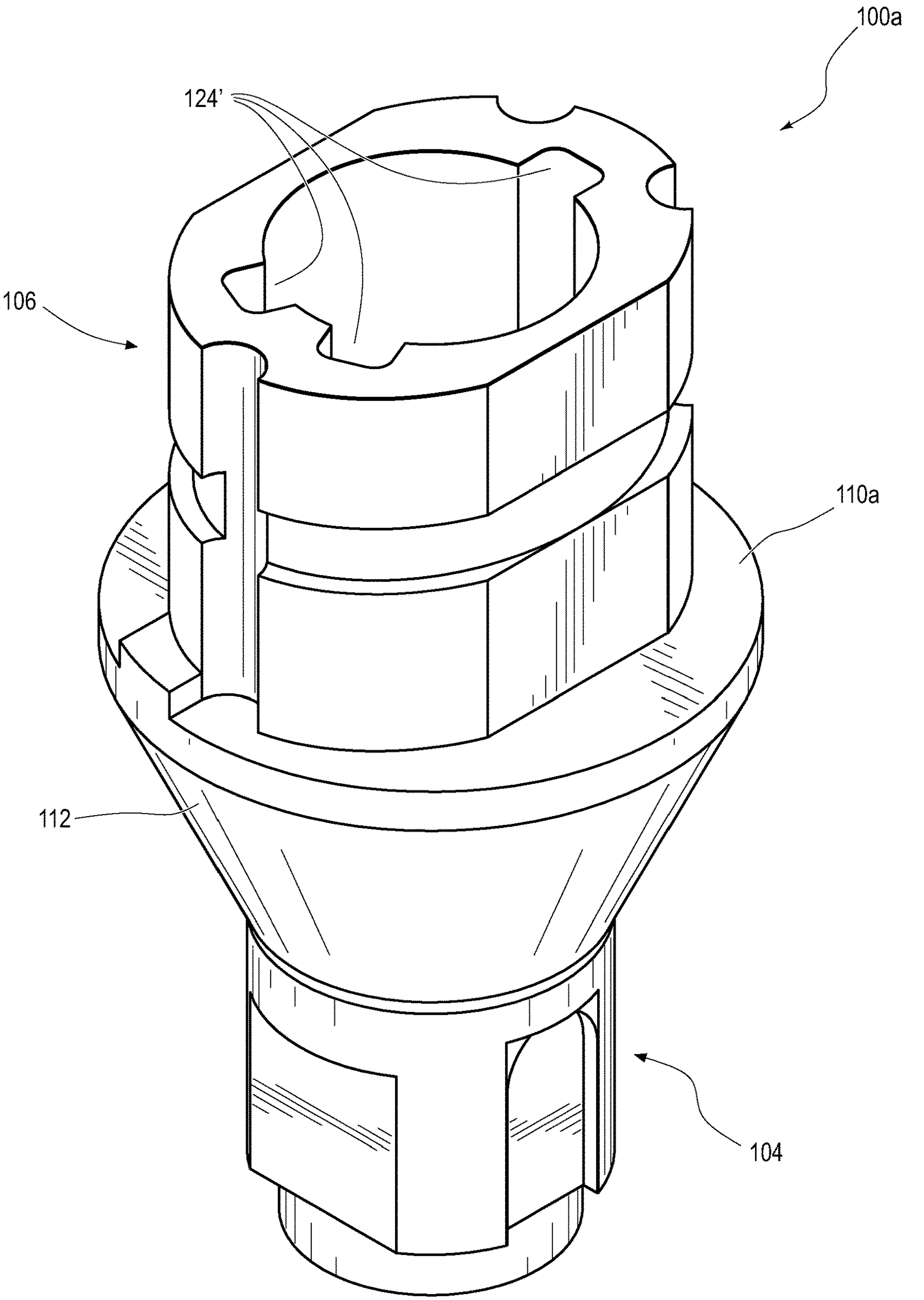
FIG. 2 illustrates a perspective view of another exemplary omni-abutment according to another embodiment of the present disclosure.

FIG. 2 illustrates another exemplary abutment 100*a*, e.g., including similar features to those described for abutment 100 in FIGS. 1A-1B. Some principal differences include the lack of various optional features (e.g., internal threading 126 within abutment 100*a*, indentations 120, recesses 122), as well as a more square shape to the interior indentations 124' in the hollow axial channel of coronal superstructure connection portion 106.

Figure 3:
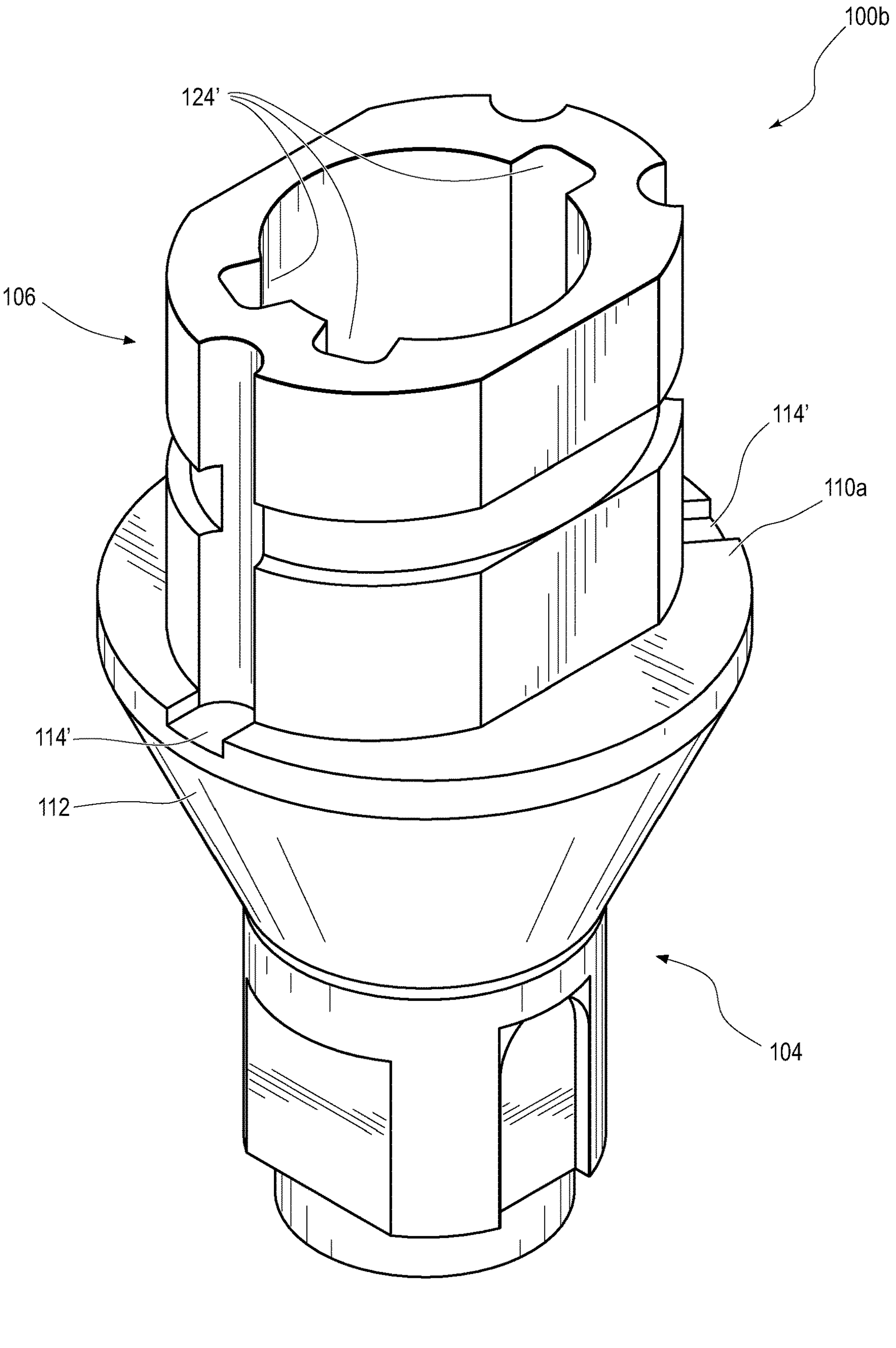
FIG. 3 illustrates a perspective view of another exemplary omni-abutment according to another embodiment of the present disclosure.

FIG. 3 illustrates another exemplary abutment 100*b*, e.g., including similar features to those described for abutments 100 and 100*a* in FIGS. 1A-2. A principal difference includes the inclusion of a differently configured platform marker 114', which is not configured as a protrusion extending from top platform surface 110*a*, but is configured as a depression or recess, within the top platform surface 110*a*, as shown.

Figure 5:
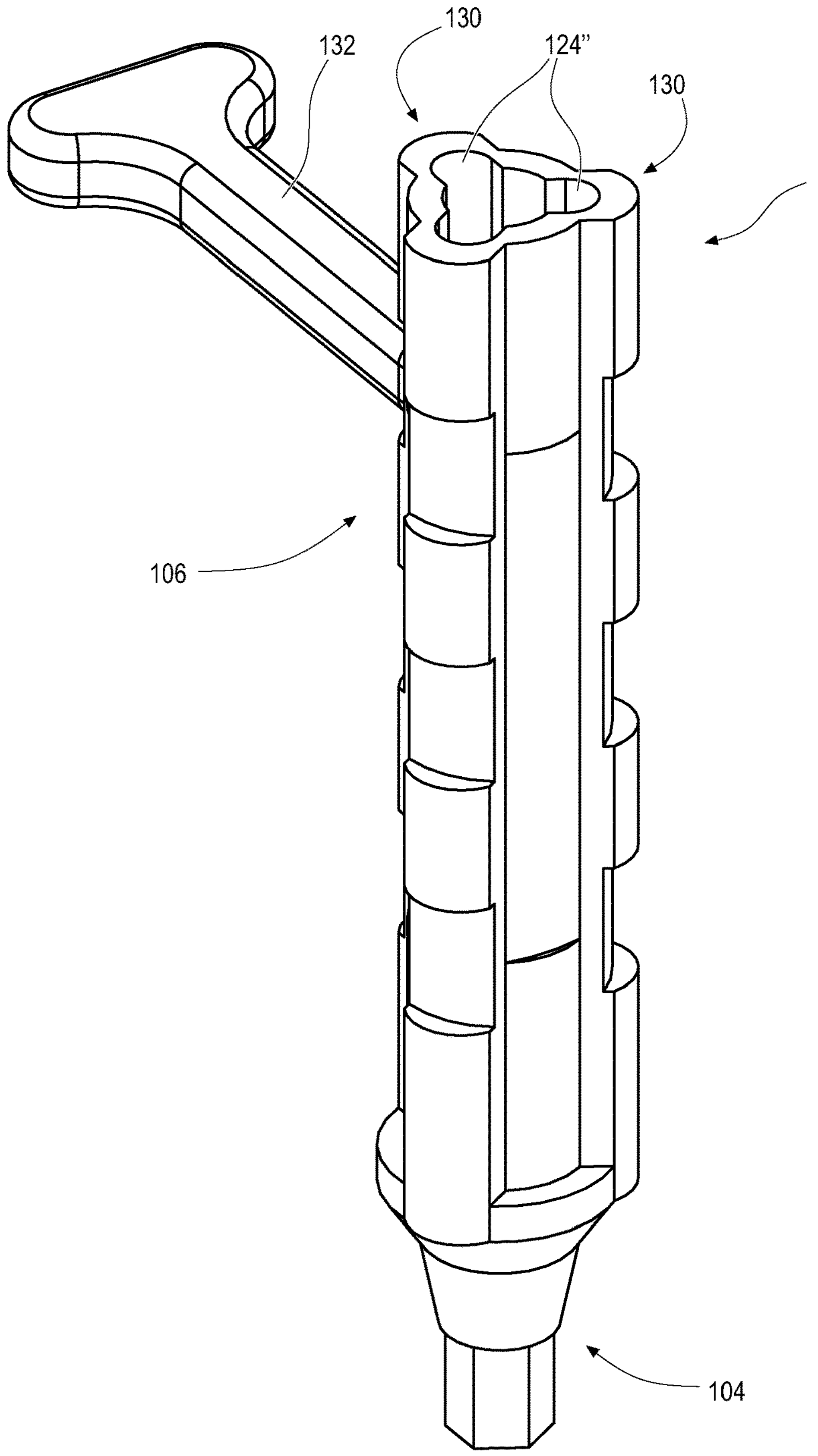
FIG. 5 illustrates a perspective view of another exemplary omni-abutment according to another embodiment of the present disclosure.
Figure 6A:
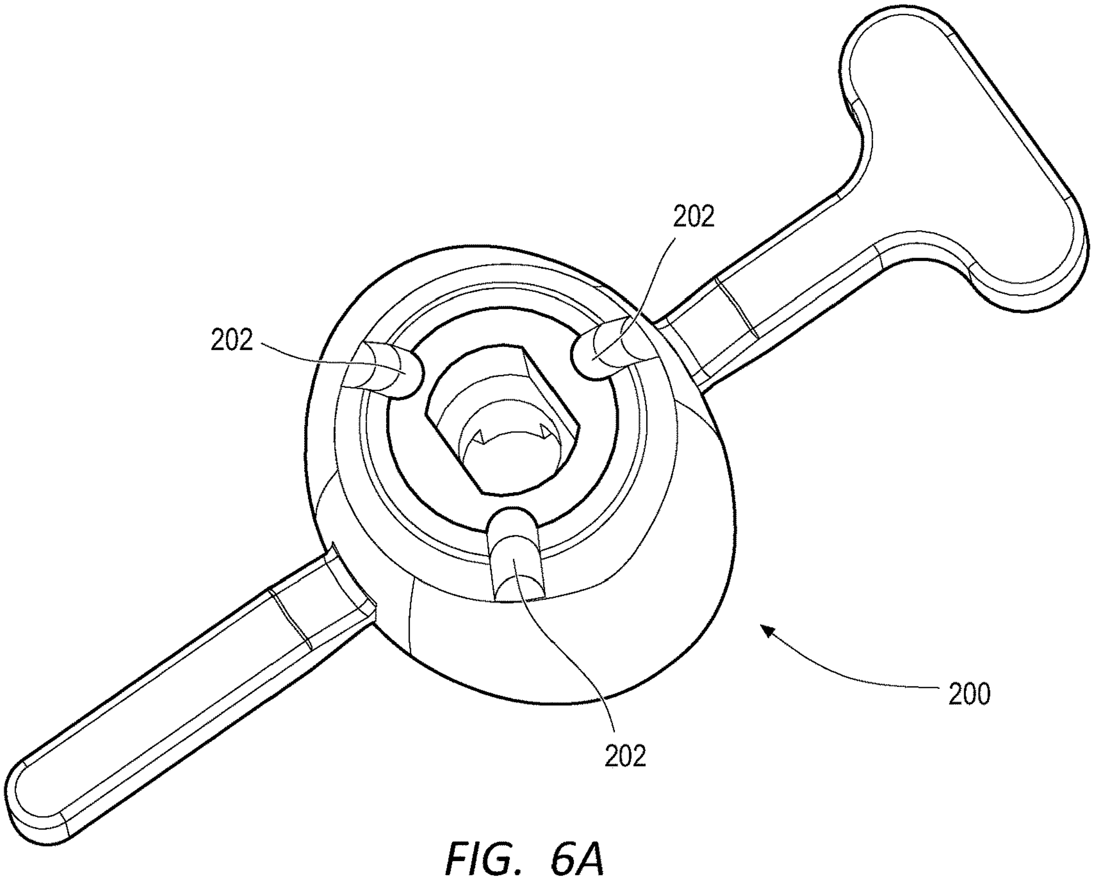
FIGS. 6A-6B illustrate bottom and top perspective views of an exemplary gingival healing cuff that may be used with an omni-abutment according to an embodiment of the present disclosure.
Figure 6B:
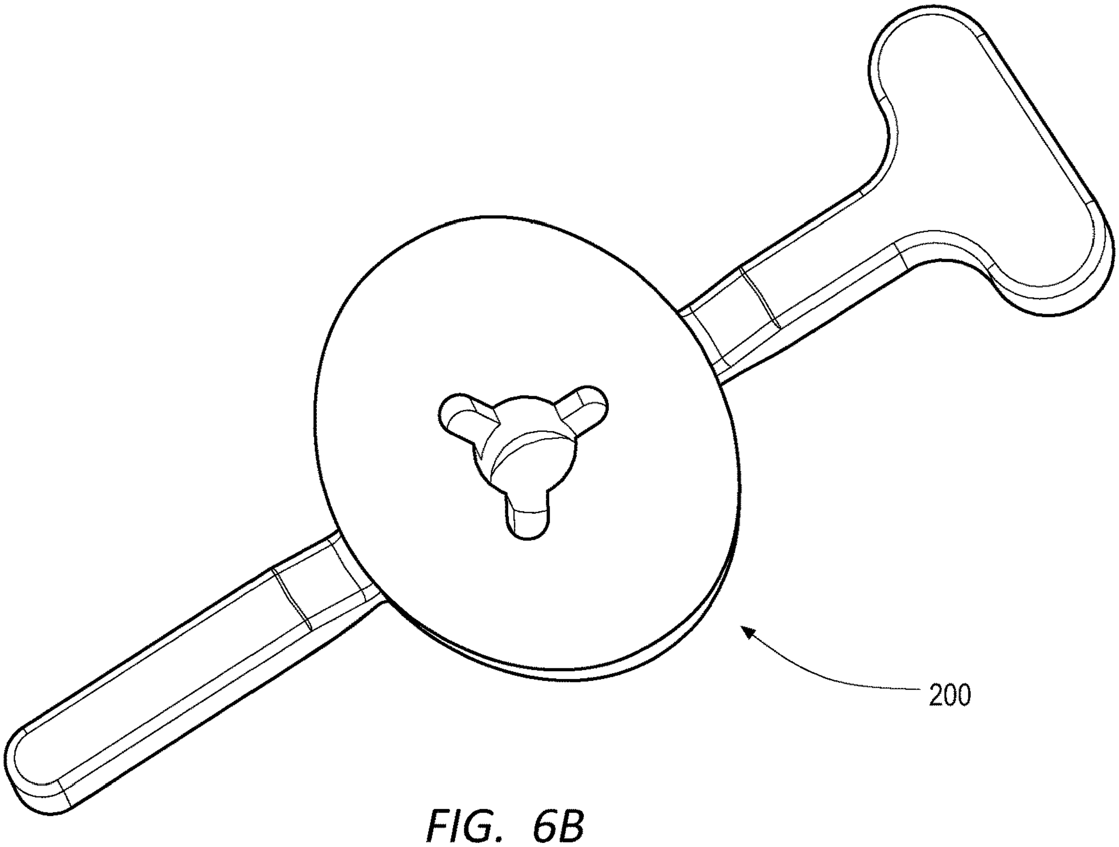
Figure 7A:
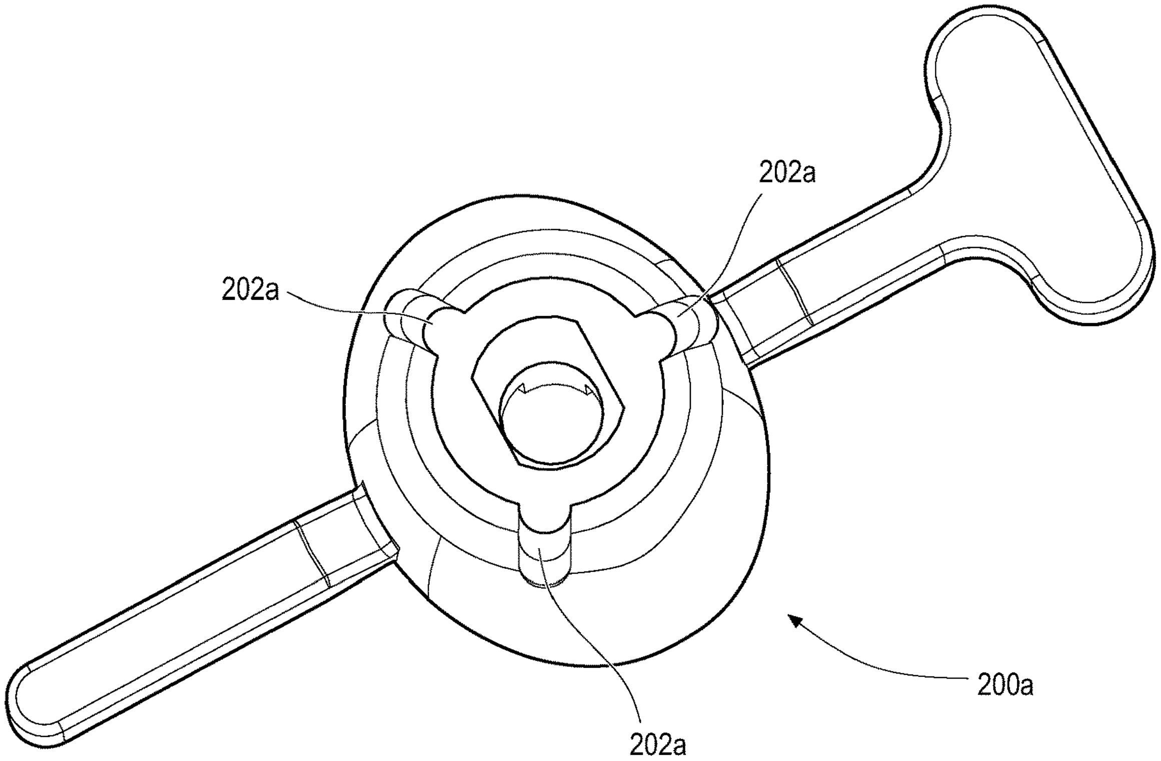
FIGS. 7A-7B illustrate bottom and top perspective views of another exemplary gingival healing cuff that may be used with an omni-abutment according to an embodiment of the present disclosure.
Figure 7B:
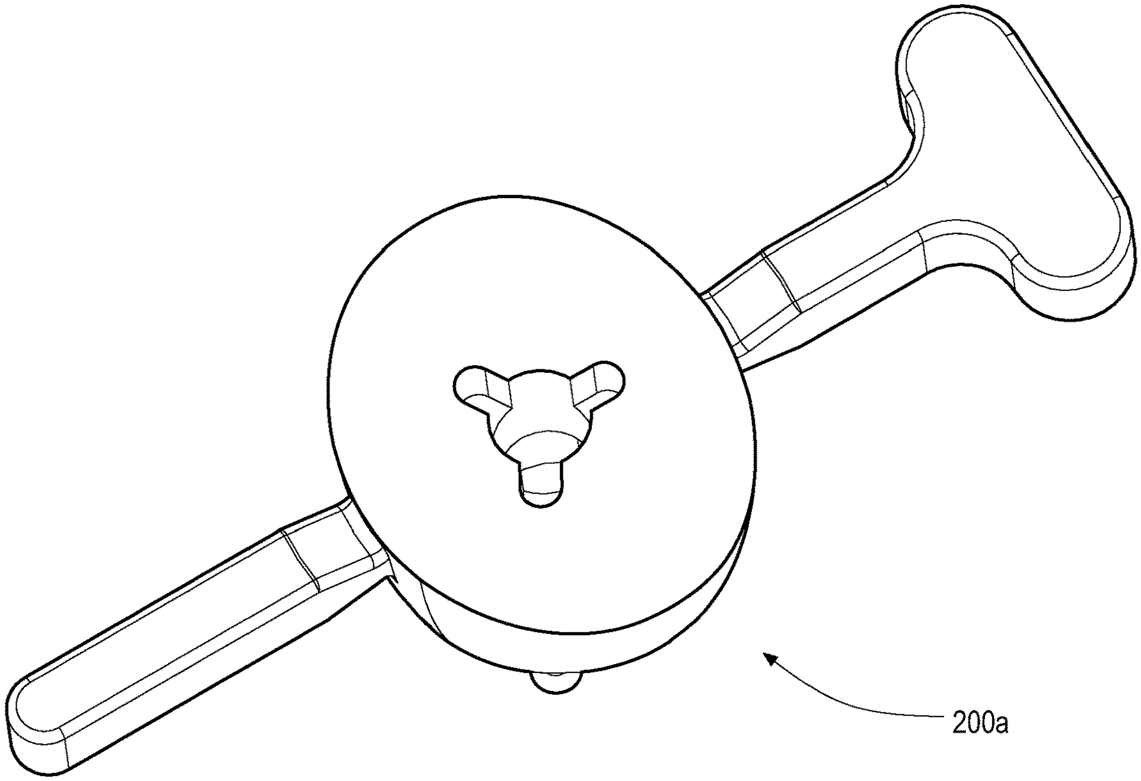

FIG. 5 illustrates another exemplary abutment 100*c*, which similarly includes an apical connection portion 104 and a coronal superstructure connection portion 106. Abutment 100*c* is shown as including a tri-lobe configuration both at the interior (with respect to tri-lobe vertical indentations 124", as well as a tri-lobe configuration at the exterior periphery surface designated at 130. Such a tri-lobe configuration provides for good scanning ability, and the ability to recognize orientation and position when taking a scan using such an abutment. A T-shaped handle 132 is also shown attached at a buccal face. Such a handle may be removable. The apical connection portion shows use of a hex connection, while the apical connection portions of abutments 100, 100*a* and 100*b* illustrate a different apical connection configuration. It will be appreciated that any apical connection configuration may be provided.

Any of the described omni-abutments may be formed from any desired biocompatible material (e.g., titanium, biocompatible ceramics, 3D printed from a biocompatible resin, or the like). The omni-abutment may be precision milled, injection molded, or may be 3D printed (e.g., 3D printed metal, or 3D printed polymer resin). The gingival healing cuffs may be similarly formed (e.g., 3D printed, injection molded, or milled). Other manufacturing methods and materials may also be possible when fabricating any of the components. In an embodiment, the gingival healing cuffs are formed from a non-metallic material, allowing them to be easily shaped chair-side, should the practitioner so choose.

FIGS. 6A-6B and 7A-7B illustrate exemplary gingival healing cuffs that may be used with a corresponding abutment. For example, gingival healing cuffs 200 and 200*a* of FIGS. 6A-6B may couple over the coronal superstructure connection portion of a complementary shaped abutment. The principal difference between illustrated gingival healing cuffs 200 and 200*a* is the presence of the mating recesses 202 at the bottom of cuff 200, while cuff 200*a* is shown as including mating protrusions. FIGS. 8A-8D illustrate another exemplary gingival healing cuff 200*b* that is specifically configured for use with the omni-abutments of FIGS. 1A-1B, and FIGS. 4A-4B.

Figure 9A:
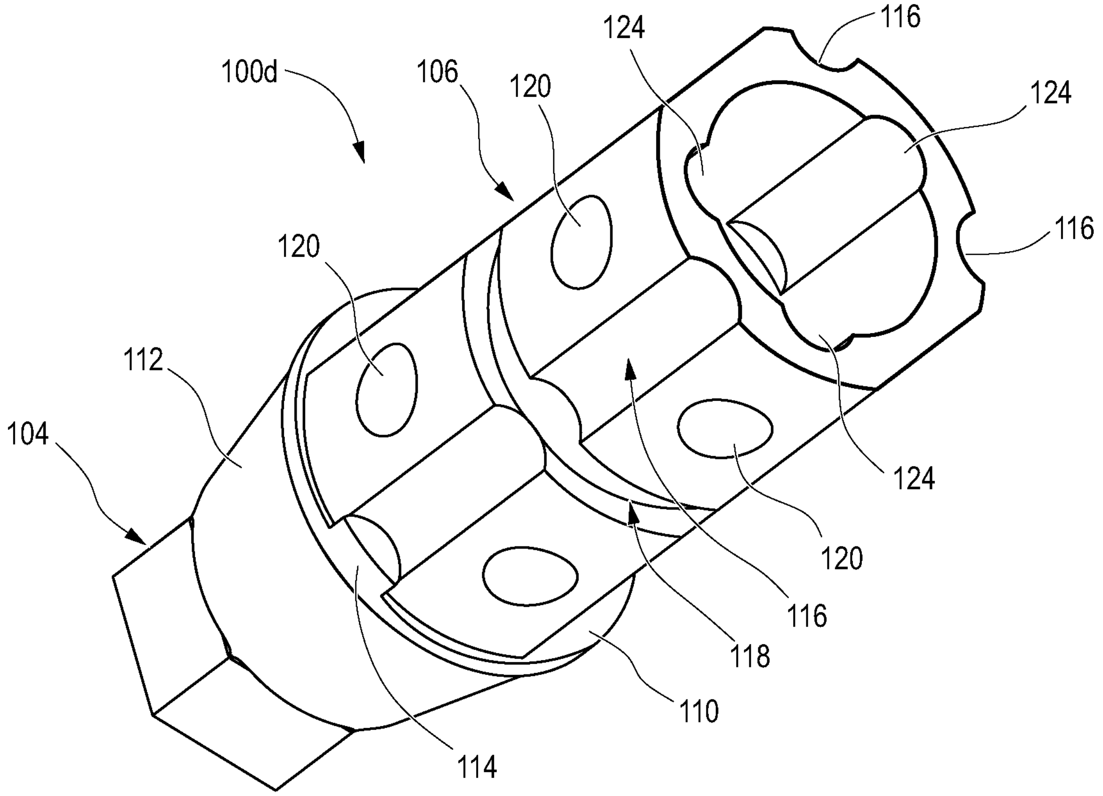
FIGS. 9A-9B illustrate another exemplary omni-abutment according to the present disclosure, including a generally circular platform, with platform markers.
Figure 9B:
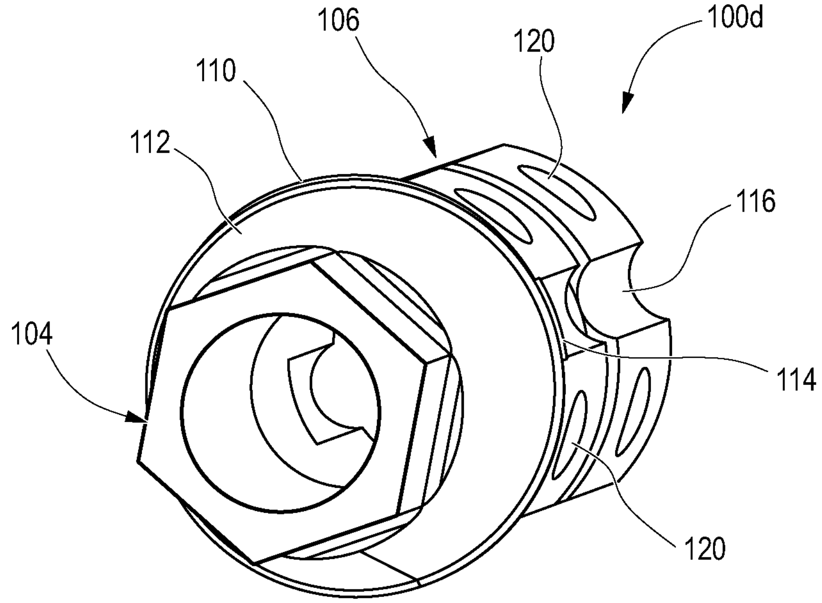
Figure 10A:
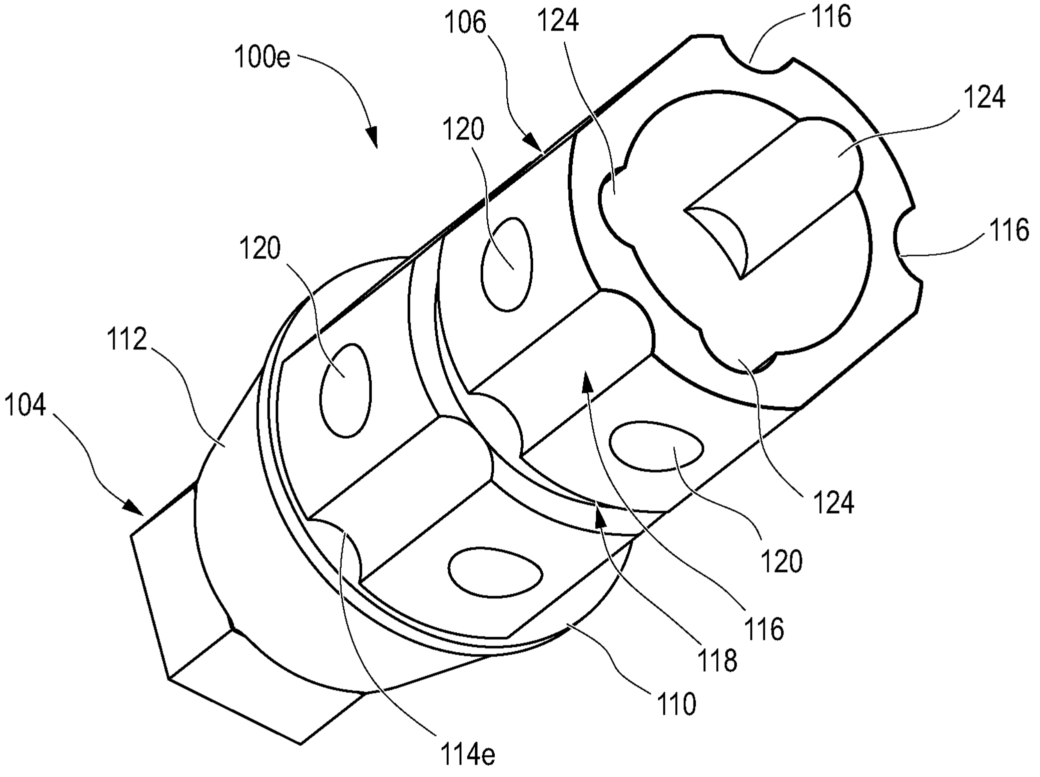
FIGS. 10A-10B illustrate another exemplary omni-abutment according to the present disclosure, including a generally circular platform, without platform markers.
Figure 10B:
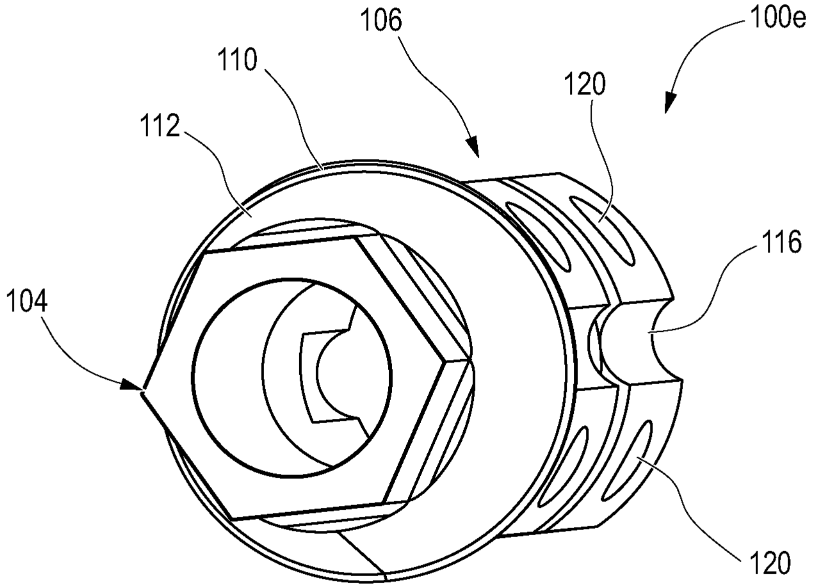

FIGS. 9A-15D illustrate additional examples of omni-abutments according to the present disclosure. FIGS. 9A-9B illustrate an exemplary omni-abutment 100*d* according to the present disclosure, including an apical connection portion 104 configured to mate and/or attach with a receiving portion of a corresponding implant. As the other described embodiments, a coronal superstructure connection portion 106 is provided, serving as a core that is connected to the apical connection portion 104. The illustrated coronal superstructure connection portion of abutment 100*d* includes a tri-lobe interior structure (e.g., associated with indentations or grooves 124). The exterior surface of coronal superstructure connection portion 106 is also shown as including vertical grooves or other recessed portions 116, to provide the exterior with a tri-lobe configuration as well. As with the other described embodiments, a platform 110 and collar 112 are also provided. A platform marker 114 is shown protruding from platform 110, shown as flush with the radial edge of the platform 110, similar to other illustrated embodiments. The platform marker 114 is shown as positioned within vertical groove 116. The other vertical grooves positioned on the opposite side of the abutment may also include the same or a different platform marker. The platform in FIGS. 9A-9B and 10A-10B may be substantially circular in shape. The configuration 100*e* shown in FIGS. 10A-10B is similar to that of FIGS. 9A-9B, except that no protruding platform marker 114 is present. The intersection itself of the vertical groove 116 with platform 110 at 114*e* may serve as an identifiable "platform marker" in such an embodiment.

Figure 11A:
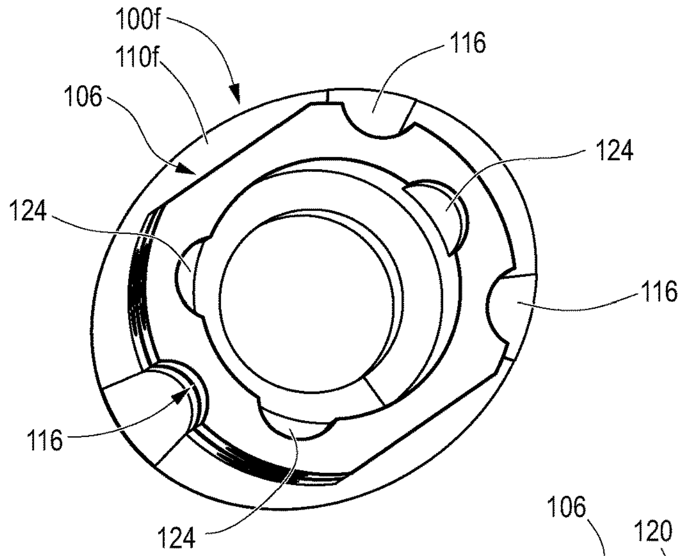
FIGS. 11A-11C illustrate another exemplary omni-abutment according to the present disclosure, including a generally oval platform, with platform markers.
Figure 11B:
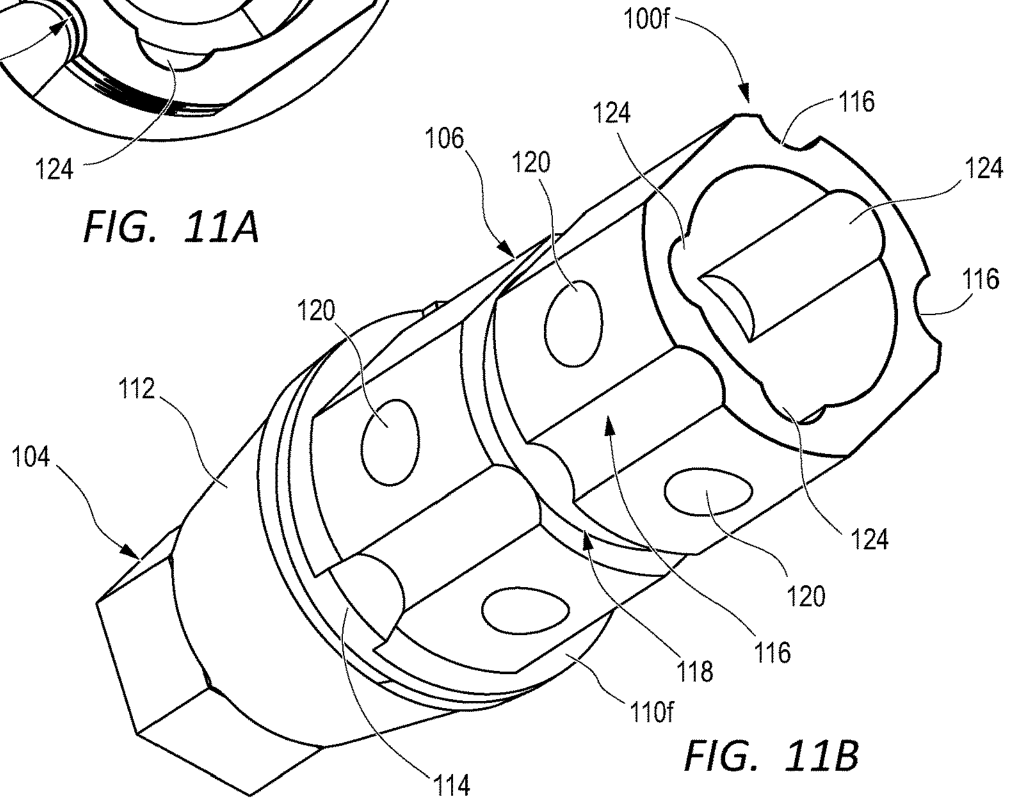
Figure 11C:
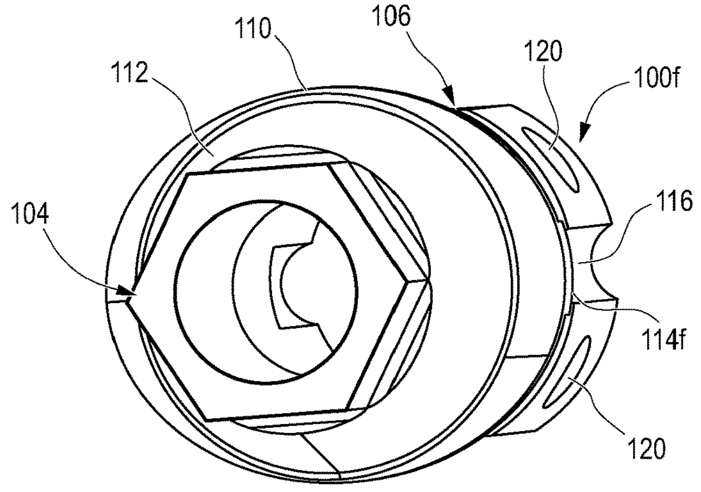
Figure 12A:
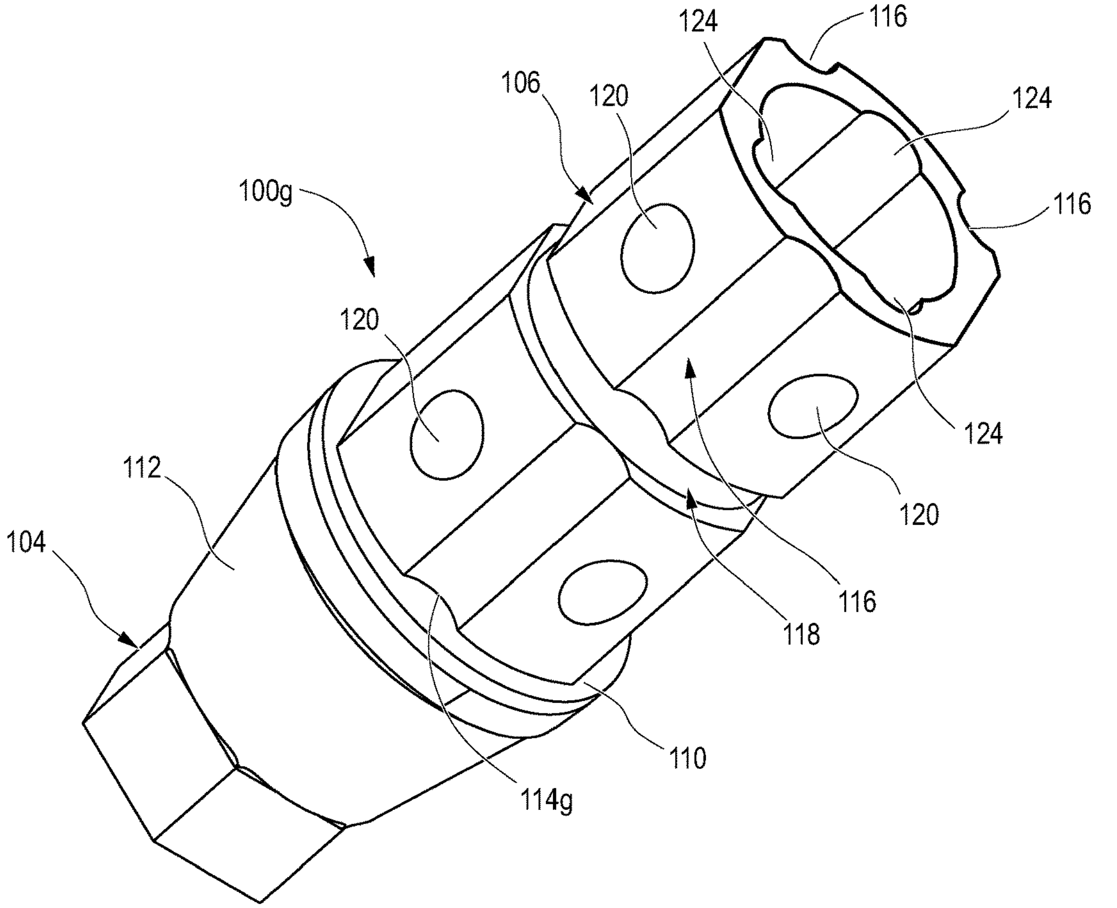
FIGS. 12A-12B illustrate another exemplary omni-abutment according to the present disclosure, including a generally oval platform (similar to that of FIGS. 11A-11C), but without platform markers.
Figure 12B:
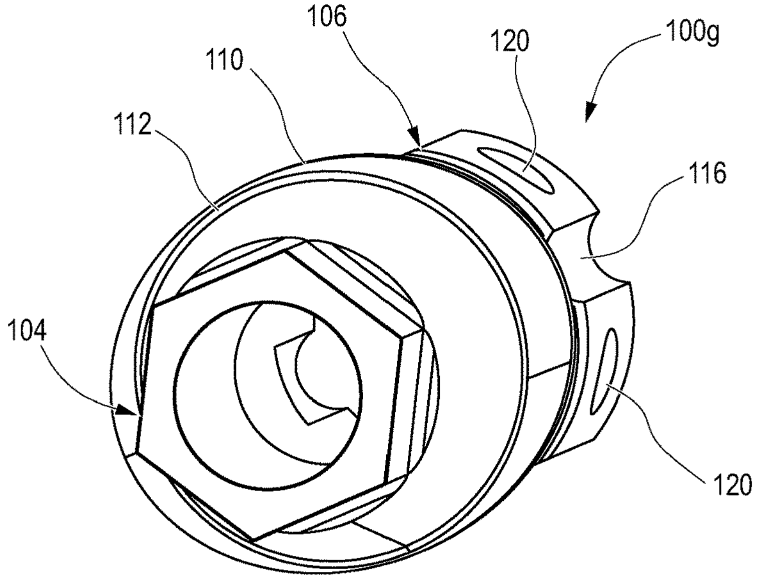
Figure 13A:
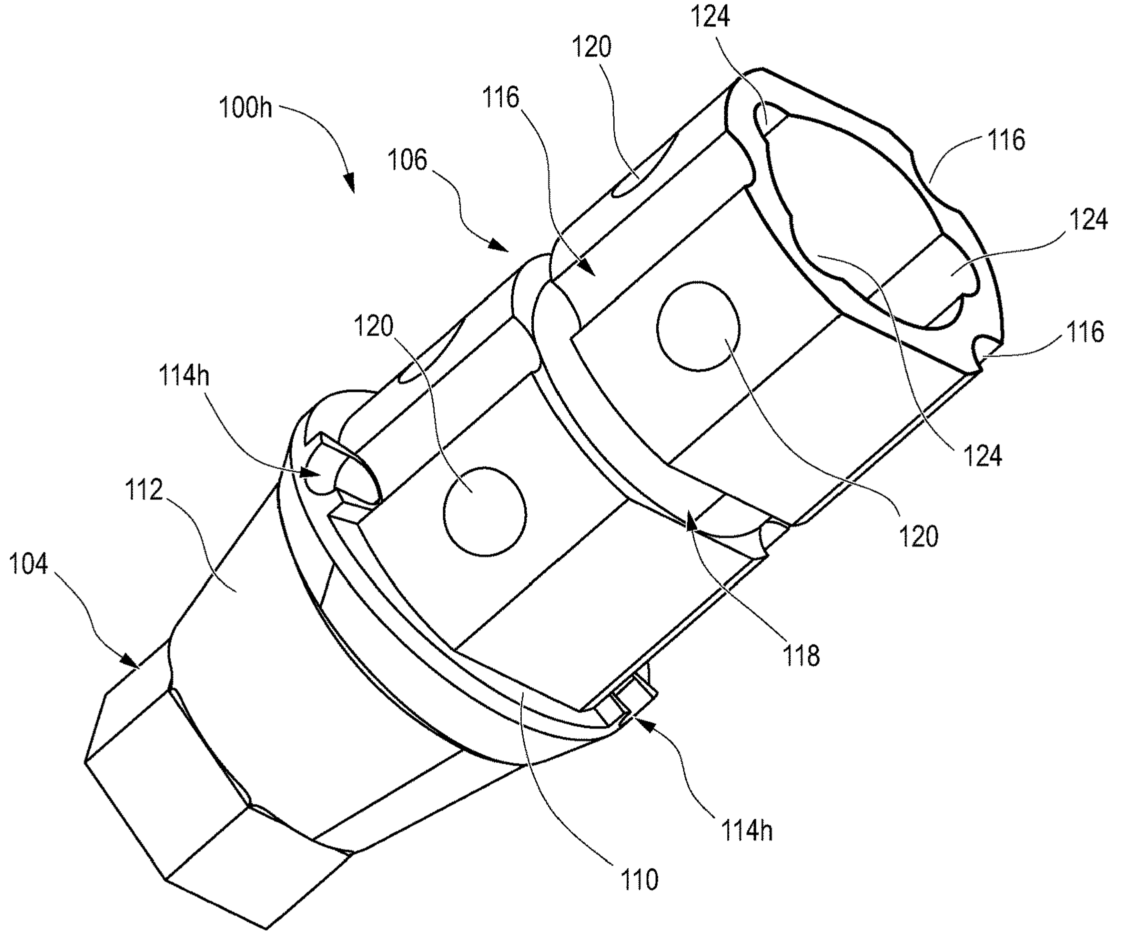
FIGS. 13A-13B illustrate another exemplary omni-abutment according to the present disclosure, including a generally oval platform, with a plurality of crescent-shaped platform markers.
Figure 13B:
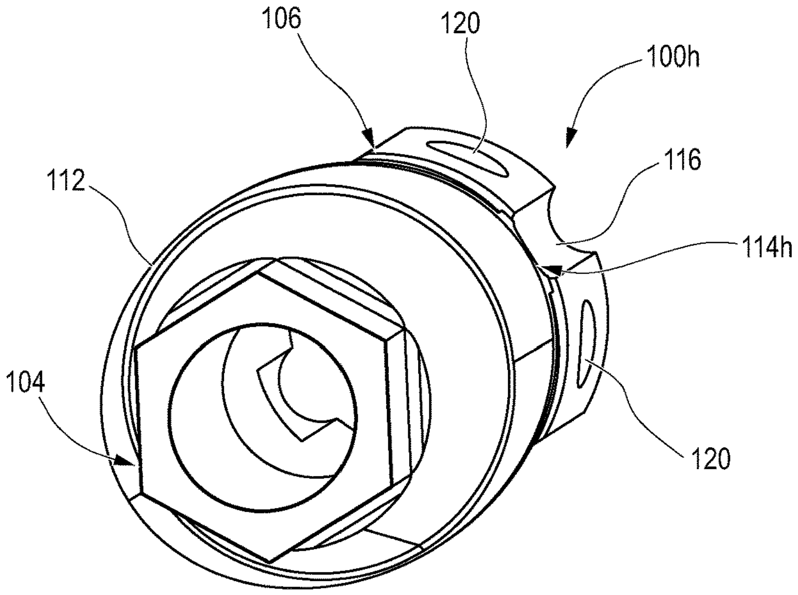
Figure 14A:
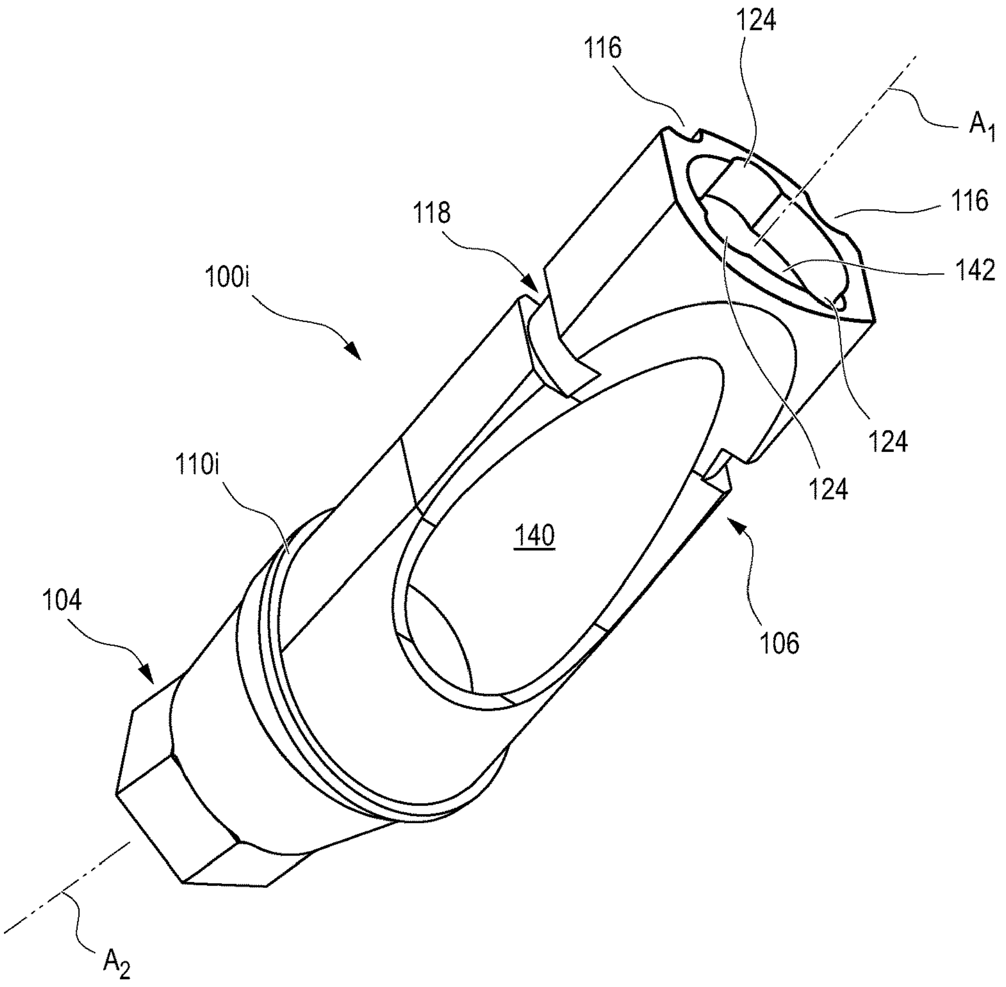
FIGS. 14A-14D illustrate another exemplary omni-abutment according to the present disclosure, including an angled configuration, with a generally oval platform, without platform markers.
Figure 14B:
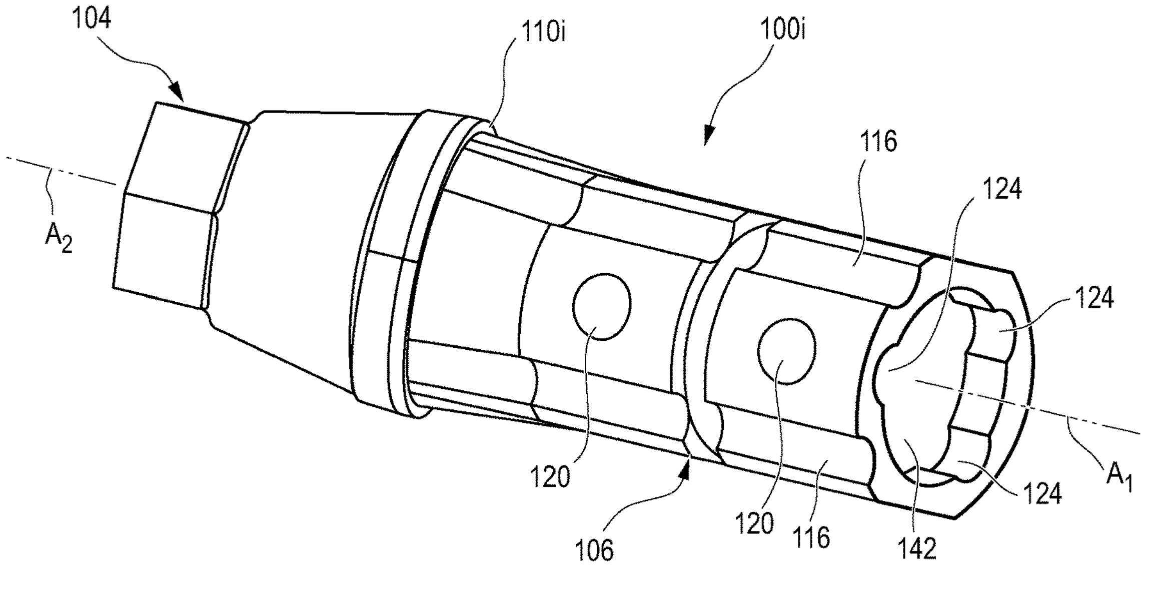
Figure 14C:
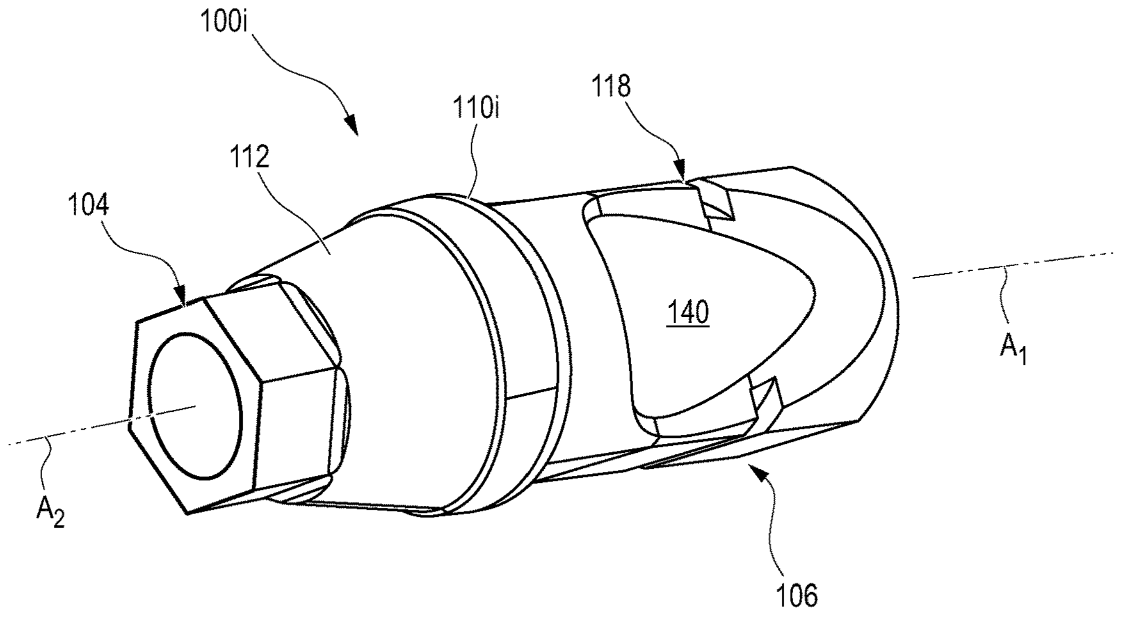
Figure 14D:
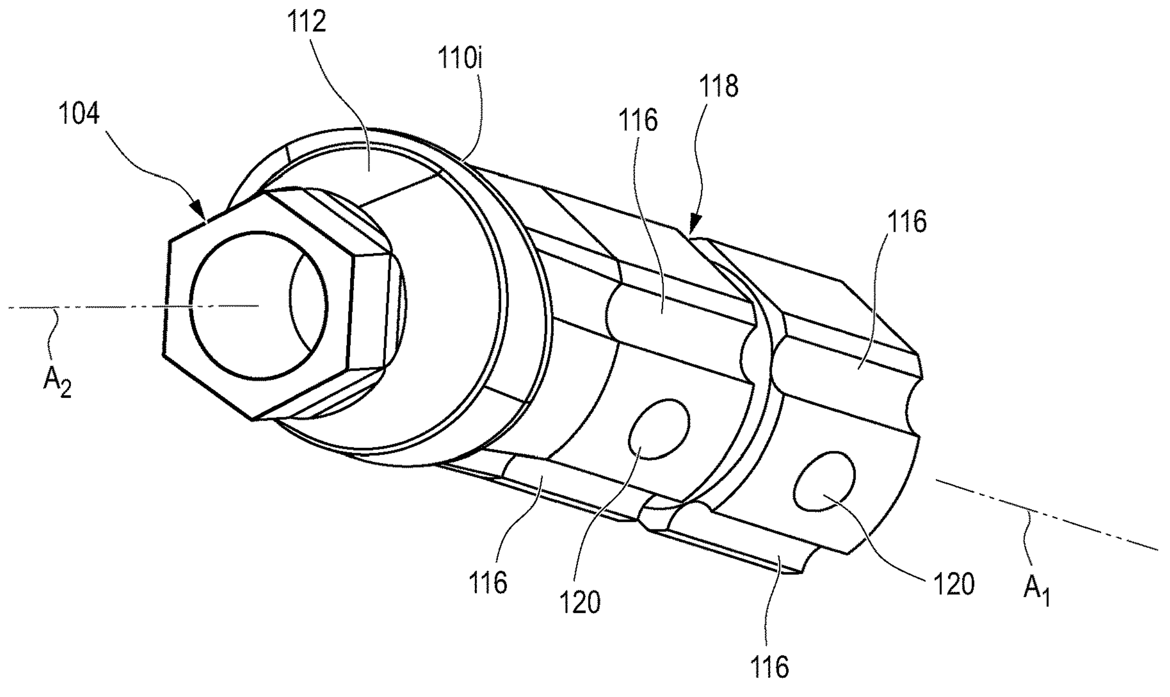
Figure 15A:
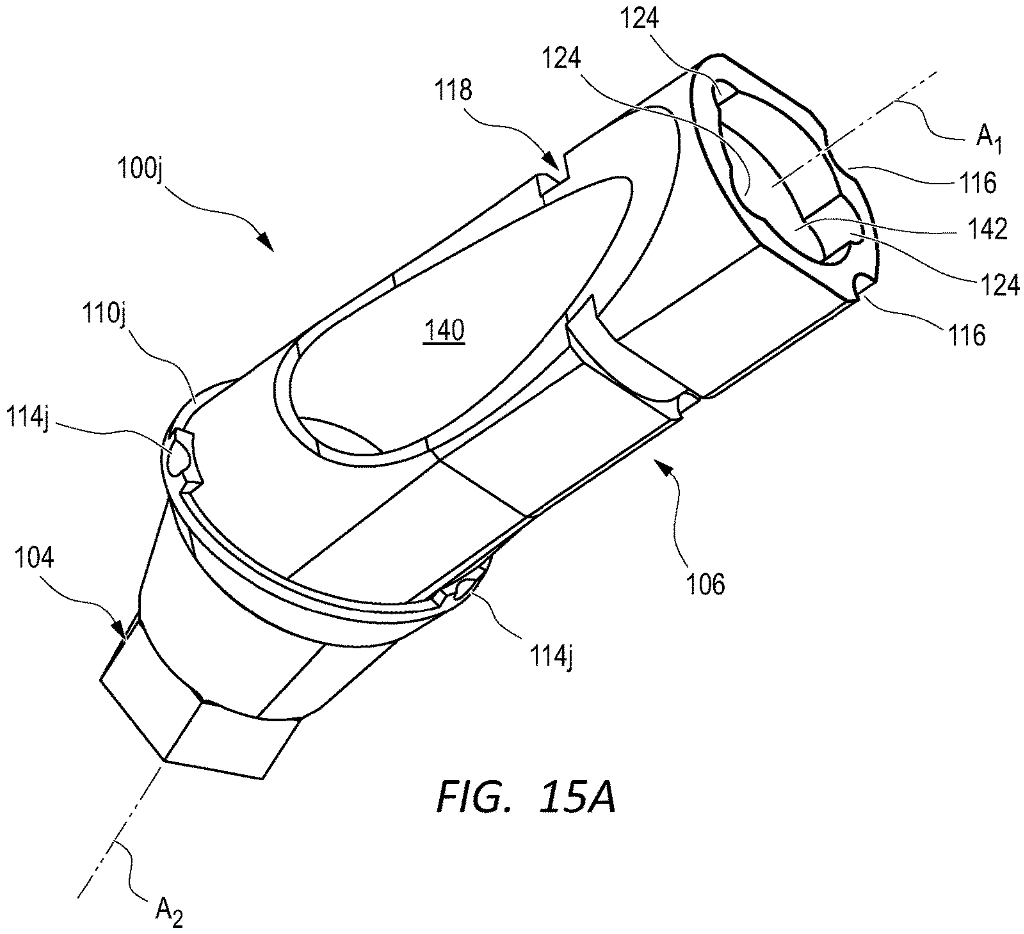
FIGS. 15A-15D illustrate another exemplary omni-abutment according to the present disclosure, including an angled configuration, with a generally oval platform, with a plurality of crescent-shaped platform markers.
Figure 15B:
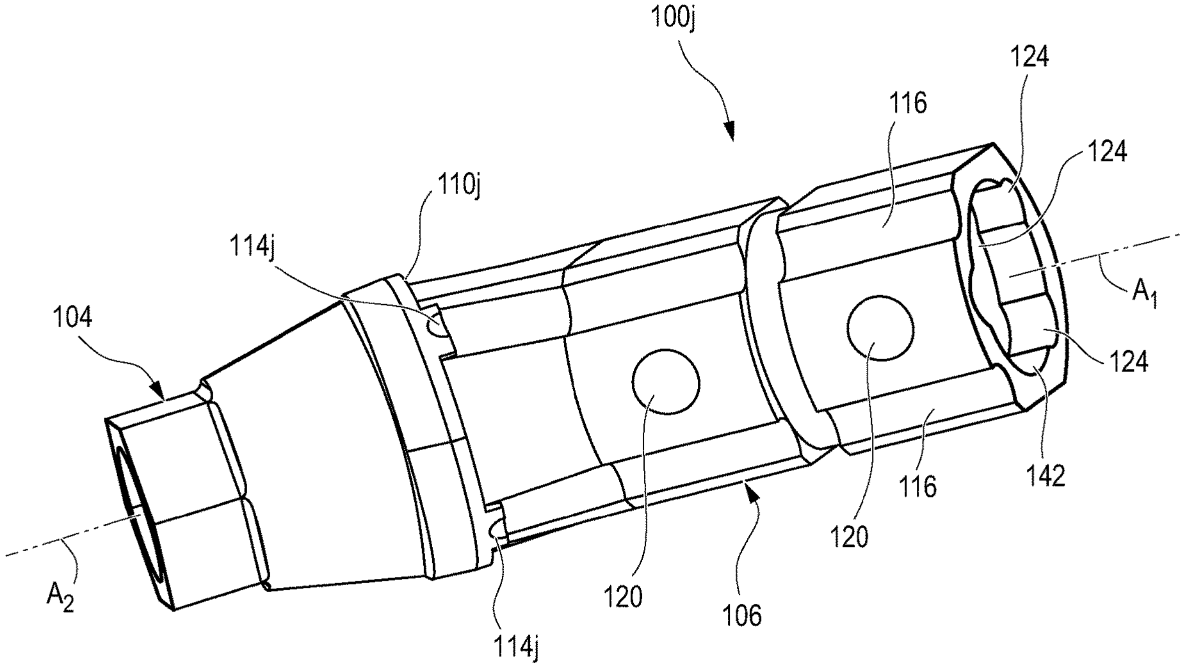
Figure 15C:
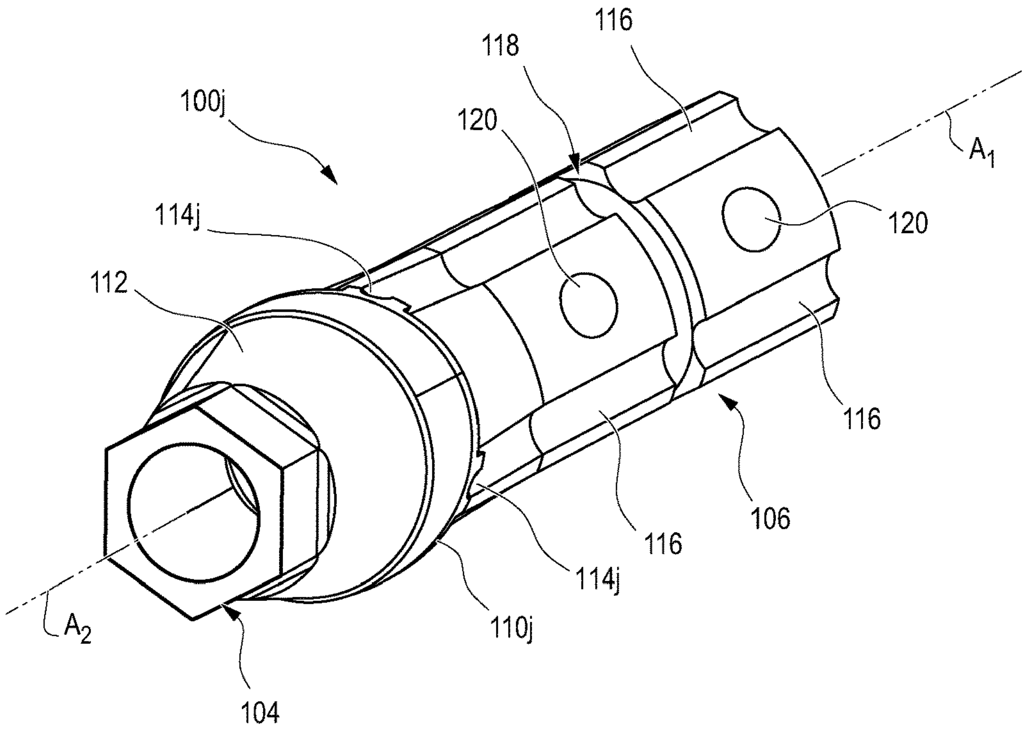
Figure 15D:
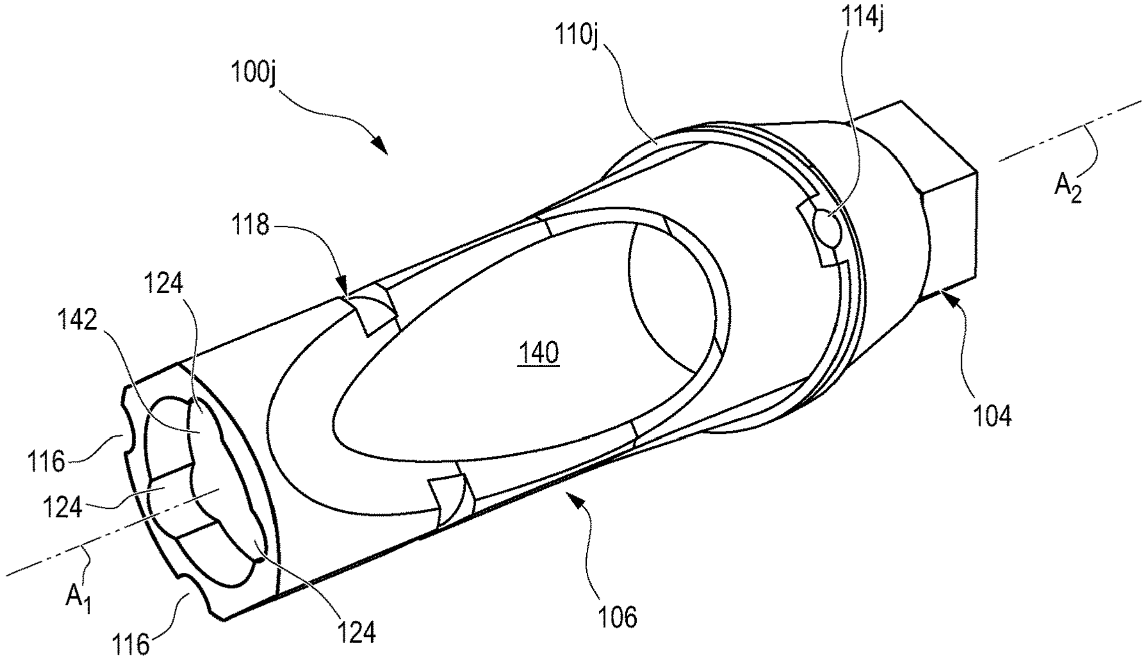

Other illustrated embodiments, such as those of FIGS. 11A-13B show an oval shaped platform 110*f*. Such embodiments may otherwise be similar to those shown and described in conjunction with FIGS. 9A-9B, or other embodiments also described herein. FIGS. 11A-11C illustrate a configuration 100*f* similar to that of FIGS. 9A-9B, except with an oval shaped platform 110*f*. FIGS. 12A-12B illustrate a configuration 100*g* similar to that of FIGS. 11A-11C, but without any protruding platform marker 114. Rather, as with configuration 100*e* of FIGS. 10A-10B, the intersection of vertical groove 116 with platform 110 at 114*g* may serve as a "platform marker" in such an embodiment, for scanning, and other purposes. FIGS. 13A-13B illustrate a configuration 100*h* similar to that of FIGS. 11A-11C, but with a differently shaped and configured protruding platform marker 114*h*, which may be referred to as a crescent shaped platform marker. Such a platform marker may be similar to marker 114 of FIGS. 9A-9B and 11A-11B, but where the coronal surface of the protruding marker includes a recess formed therein, as shown. It will be apparent that a wide variety of shapes could be employed for such markers, and that the illustrated configurations are merely exemplary. A circular platform and configuration may be particularly beneficial for particular tooth positions, while an oval shaped platform and configuration may be particularly beneficial for other tooth positions.

For example, in relatively narrow tooth sites such as the lower incisors or upper lateral incisors, ovoid shape platforms can be advantageous to provide less mesiodistal abutment width as compared to an otherwise similar circular platform, having the same diameter as the major axis of the ovoid. It is worth noting that if the platform is too wide, it can easily be reduced in width with a dental bur even where formed from titanium or similar biocompatible metallic material, because it is so thin. With scanning of the connection portion as a main focus of indexing, customizing a portion of the platform in this way should not significantly adversely affect the scanning process.

FIGS. 14A-14D illustrate another exemplary omni-abutment 100*i* which is similar that that shown in FIGS. 12A-12B, with an oval shaped platform 110*i*, but in which the omni-abutment is not straight (as are those described previously), but has an angled configuration, such that the apical connection portion 104 defines a longitudinal axis A2 that differs from a longitudinal axis A1 of the coronal superstructure connection portion 106. In the straight configurations illustrated in FIGS. 9A-13B the apical connection portion 104 and the coronal superstructure connection portion are oriented within the same longitudinal axis of the omni-abutment. The omni-abutment 100*i* including an angled configuration is shown as including an access opening 140, which may provide an opening into the apical portion of the coronal superstructure connection portion 106 and into apical connection portion 104, where such opening 140 may be coaxial with axis A2. Such an opening may allow for access to a retention screw or the like used to secure the abutment to an underlying corresponding implant. The coronal face of the coronal superstructure connection portion may include a similar tri-lobe interior opening, as shown and described relative to the other embodiments, e.g., defined by indentations or grooves 124, which run parallel with axis A1). In an embodiment, an opening may be provided between opening 140 and the tri-lobe interior opening defined by indentations or grooves 124. In another embodiment, there may be a barrier between the two, e.g., with a floor 142, preventing communication between the two otherwise adjacent cavities.

FIGS. 15A-15D illustrate another exemplary omni-abutment 100*j* similar to that of FIGS. 14A-14D, with an oval shaped platform 110*j* but which is shown as including platform markers 114*j*, similar to the crescent shaped platform markers shown in FIGS. 13A-13B. It will be appreciated that no such markers, or any of a wide variety of such markers, may be present.

Figure 8A:
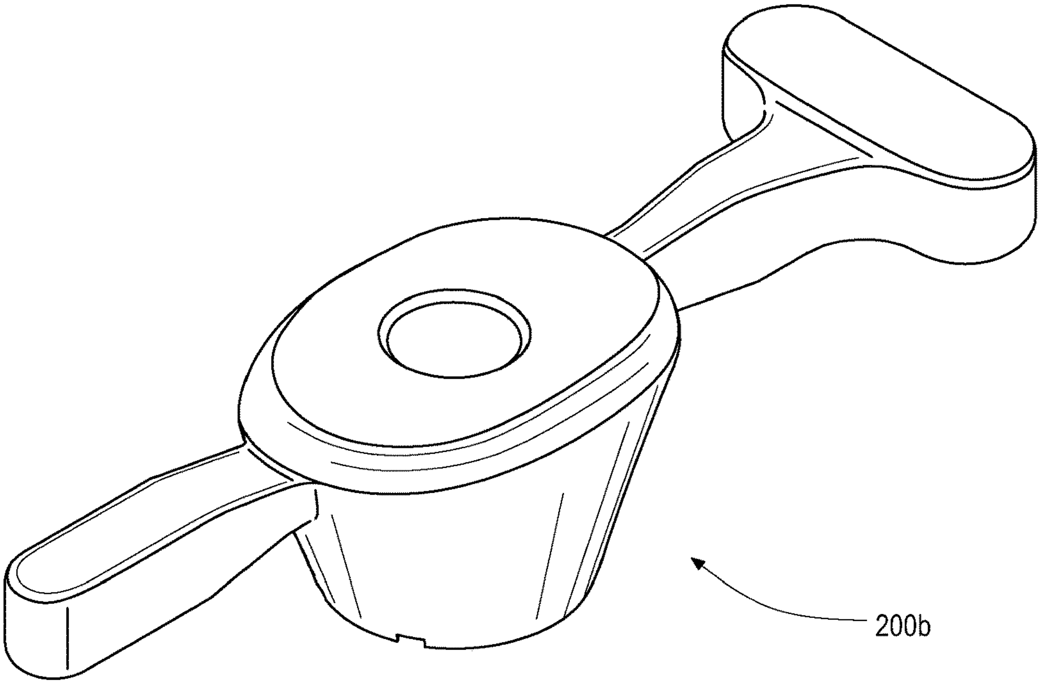
FIGS. 8A-8B illustrate bottom and top perspective views of another exemplary gingival healing cuff that may is specifically configured for use with the omni-abutment of FIG. 1A-1B, or 4A-4B.
Figure 8B:
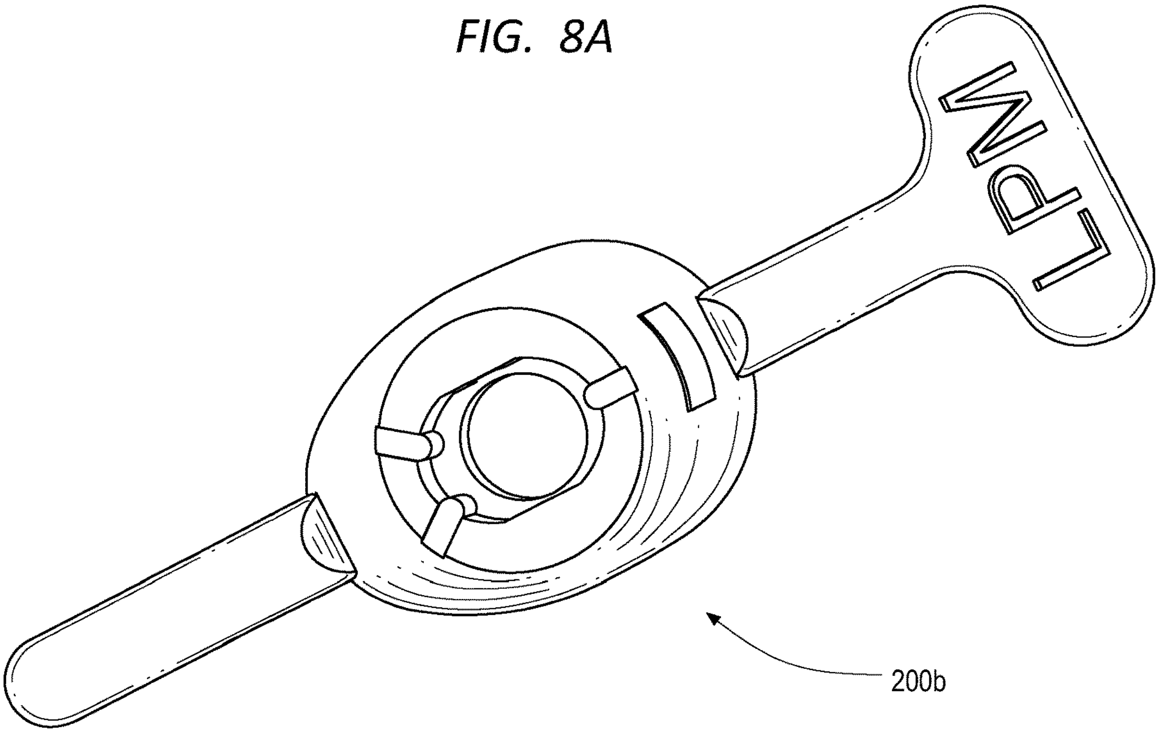
Figure 8C:
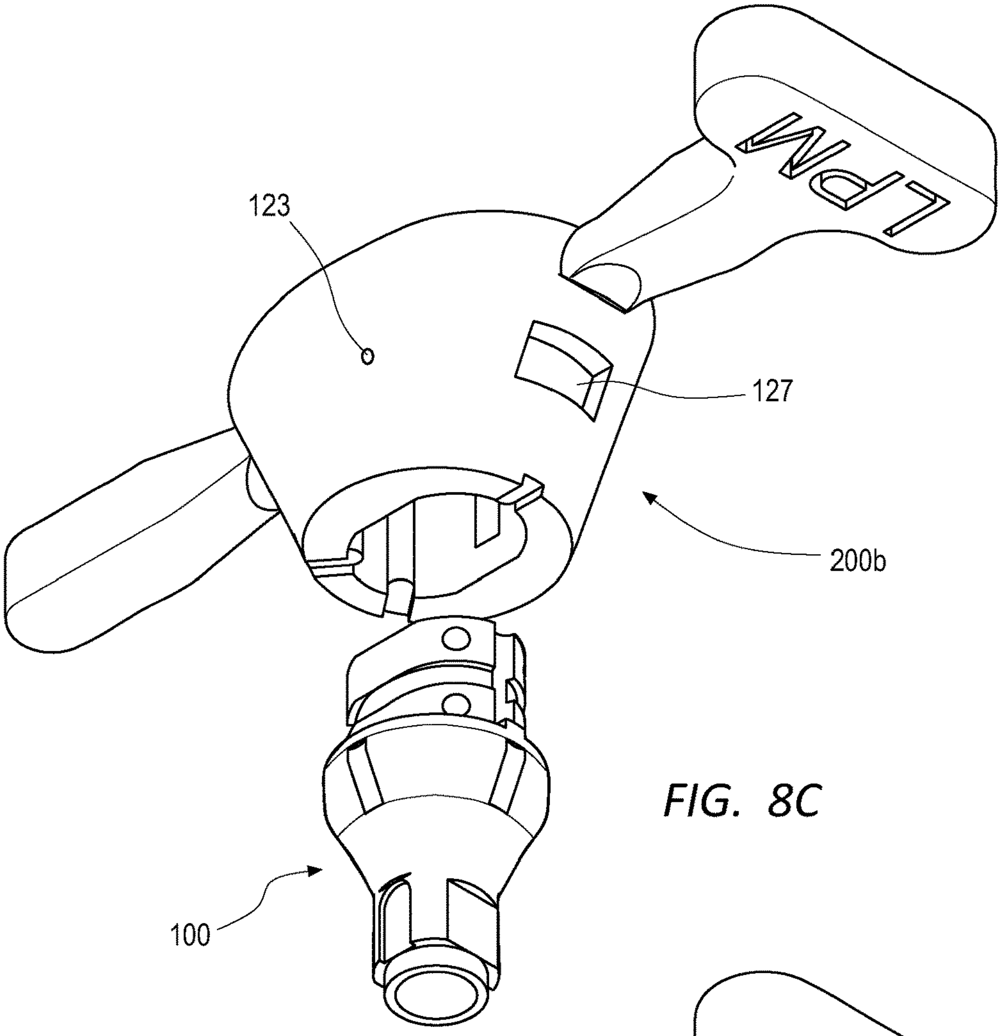
FIGS. 8C-8D illustrate the gingival healing cuff of FIGS. 8A-8B mated with the omni-abutment of FIG. 1A-1B or 4A-4B.
Figure 8D:
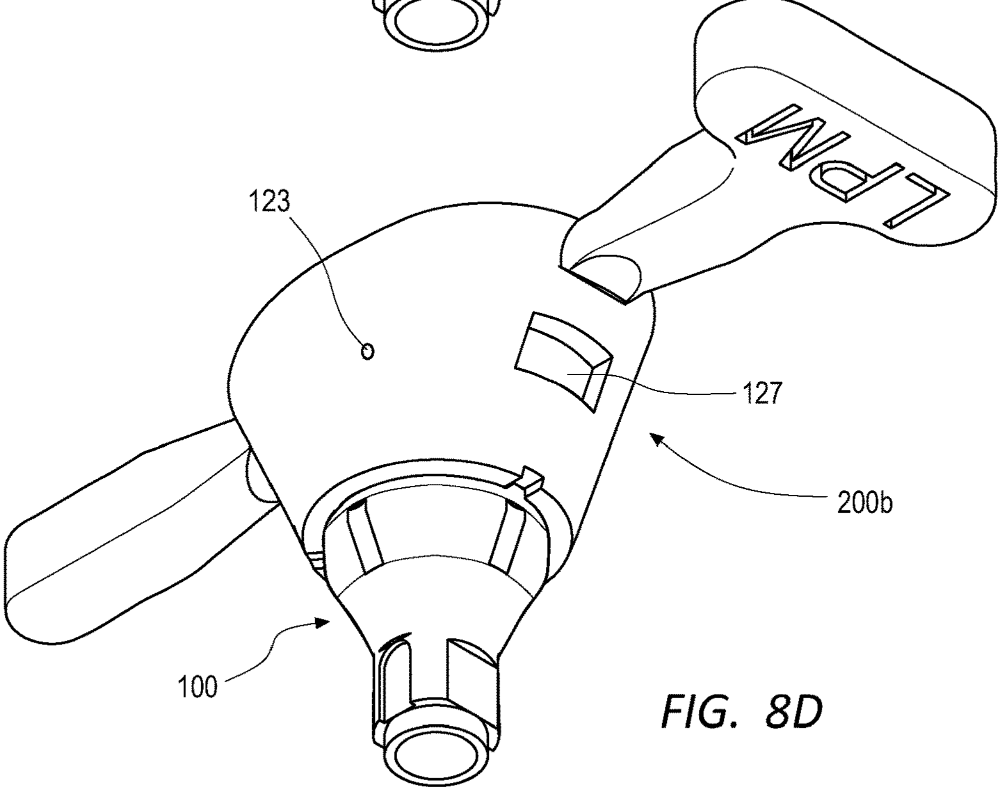
Figure 16A:
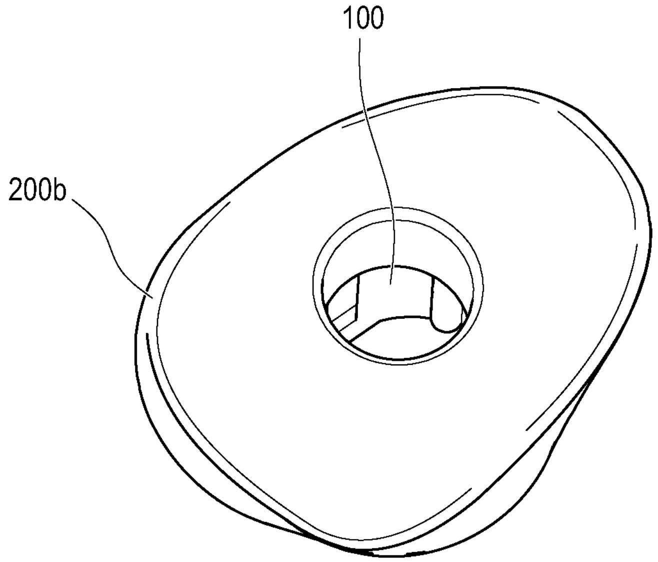
FIGS. 16A-16B illustrate views similar to that of FIG. 8D, but from a different perspective (in FIG. 16A), and with the handles removed.
Figure 16B:
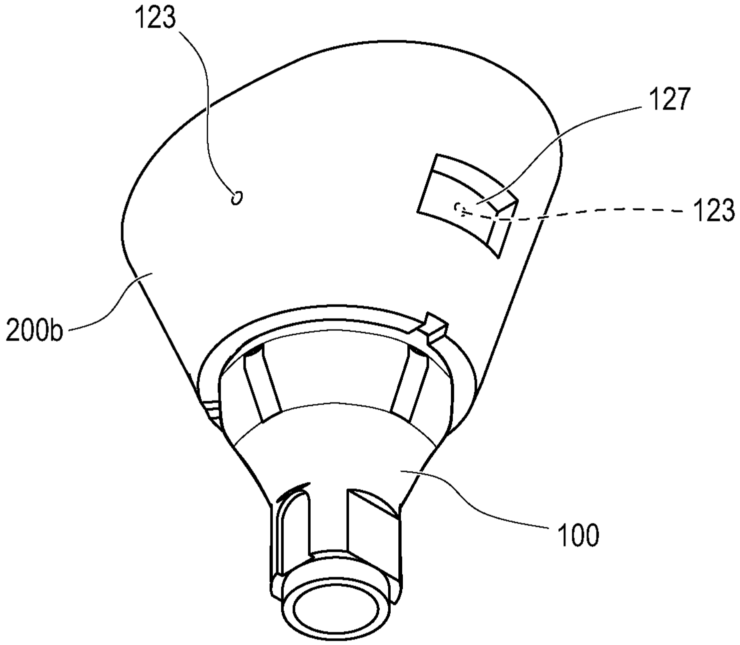

FIGS. 16A-16B illustrate views similar to that of FIG. 8D, but from a different perspective (in FIG. 16A), and with the handles removed. The internal structure within the coronal superstructure connection portion can provide definitive markers within a CT, cone beam or other scan of such assembly, to verify desired details from such scan. Such an assembly could be scanned at a full 720° (360° top to bottom, and full 360° side to side), for such verification, and other purposes.

For example, a full 720° scan can currently be done with a CT scan. With a digital scanner, the scan is normally started at the apical connection level and then rotating the gum shaper (the omni-abutment and the gingival healing cuff bonded together) to get a side to side scan and ending up on the coronal surface to capture that surface. Of course the scanner could alternatively be rotated about the gum shaper, if desired. With this scanning workflow, all the custom indexing of the gingival healing cuff accomplished with removal of handles and any custom shaping of the cuff is captured in the scan. Thus, the 720° scanning technique truly captures all areas of the gum shaper making it a custom scan body. The use of the 720° scanning workflow allows for a simple, predictable, and esthetic result for all members of the implant team (surgeon, restorative dentist, laboratory technician, and the patient).

Similarly, the gingival healing cuff may include one or more injection ports 123 (e.g., small holes on mesial and/or distal sides of the gingival healing cuff), as shown in FIG. 16B. The practitioner may apply a drop of composite or other bonding material at one or more locations on the side(s) of the gingival healing cuff, and a drop of composite or other bonding material on the abutment. Providing such injection ports in the gingival healing cuff, allow one to inject composite or other bonding material, having it flow within and around the recessed portion(s) noted above, and flow out the other injection hole port. For example, placement of injection ports into the gingival healing cuff body may better facilitate bonding of the abutment and gingival healing cuff together, e.g., by use of biocompatible injectable composite or other bonding material through such ports. Similar structure could be used for attaching a crown, cusp, bridge or other prosthetic over the gingival healing cuff body.

In another embodiment, the injection port(s) may be positioned within the rectangular box or other timing alignment structure 127, as shown in FIG. 16B.

Gingival healing cuffs including features such as those shown and described in Applicant's Patent Application Ser. No. 63/710,443, filed Oct. 22, 2024, titled "3D PRINTED OR OTHER ANATOMICAL AND CIRCULAR GINGIVAL CUFFS, herein incorporated by reference in its entirety, may be suitable for use. A wide variety of other gingival healing cuffs may also be used with the present omni-abutment.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

The invention claimed is:

1. An omni-abutment comprising:

(i) an apical connection portion that is configured to mate and/or attach with a receiving portion on a corresponding implant;

(ii) a coronal superstructure connection portion serving as a core that is connected to the apical connection portion; and wherein at least the coronal superstructure connection portion of the omni-abutment includes a tri-lobe interior structure and a tri-lobe exterior structure, wherein the omni-abutment includes a platform and a collar between the apical connection portion and the coronal superstructure connection portion, the collar including a generally frustoconical shape with a frustum of the generally frustoconical shape tapering from a top surface of the platform towards the apical connection portion; and wherein the platform comprises at least one of a protruding or indented platform marker.

2. The omni-abutment as recited in claim 1, wherein the protruding platform marker is flush with a radial edge of the platform.

3. The omni-abutment as recited in claim 1, wherein an exterior or interior configuration of the coronal superstructure is not fully symmetrical and includes one or more irregularities, so as to allow digital or analog scanning of such structure in a way that allows a practitioner to determine orientation of the omni-abutment with certainty relative to surrounding oral tissues and the corresponding implant.

4. The omni-abutment as recited in claim 3, wherein such scanning includes at least one of CT scanning, other digital scanning, x-ray, ultrasound, photogrammetry or other scanning technology.

5. The omni-abutment as recited in claim 1, wherein at least one of an exterior or interior configuration of the coronal superstructure is not fully symmetrical and includes one or more irregularities, so as to allow a dental impression of such to be used in a way that allows a practitioner to determine orientation of the omni-abutment with certainty relative to surrounding oral tissues and the corresponding implant.

6. An omni-abutment and gingival healing cuff system, comprising the omni-abutment as recited in claim 1, and a gingival healing cuff that fits over the omni-abutment, so as to mate the two together in a keyed arrangement, the gingival healing cuff having internal retention features configured to provide bonding of the omni-abutment and the gingival healing cuff together in a rigid or semirigid fashion.

7. The system as recited in claim 6, wherein the system includes a plurality of available gingival healing cuffs, each with a different size or configuration, wherein each cuff includes a hollow opening at a center portion of the gingival healing cuff, for receipt of the coronal superstructure connection portion of the omni-abutment, wherein the hollow opening in each gingival healing cuff is identically shaped or sized, or differently shaped or sized.

8. The system as recited in claim 6, wherein the system includes a plurality of available gingival healing cuffs, the cuffs are available as circular or anatomically shaped, are available in different sizes and can be customized chairside with dental materials to form a custom gingival healing cuff, custom provisional prosthesis, custom impression post and/or custom scan body.

9. The system as recited in claim 6, further comprising at least one of a buccal or lingual handle portion extending from the gingival healing cuff.

10. The system as recited in claim 9, further comprising indicia on the handle portion or elsewhere on the cuff, identifying a tooth position or shape or size or orientation of the gingival healing cuff.

11. The system as recited in claim 9, wherein the buccal or lingual handle portion includes a portion of reduced cross-sectional thickness adjacent a proximal end of the buccal or lingual handle portion, to facilitate break away by a practitioner once the buccal or lingual handle portion is no longer needed.

12. The system as recited in claim 6, wherein the gingival healing cuff further includes a rectangular box or other timing alignment structure.

13. The system as recited in claim 12, wherein the rectangular box or other timing alignment structure is configured is configured to be recessed and/or protruded from a peripheral face of the gingival healing cuff, wherein the structure allows for determination of orientation of an implant platform relative to the platform of the omni-abutment and/or gingival tissue.

14. The omni-abutment as recited in claim 6, wherein markers on internal and/or external areas of the omni-abutment, in combination with the apical connection portion or other portions of the omni-abutment, are configured to be scanned with the gingival healing cuff seated on the omni-abutment to verify abutment alignment and/or accuracy of scanner calibration.

15. The omni-abutment as recited in claim 6, wherein the platform marker is configured to aid a practitioner in verification of proper seating of the gingival healing cuff over the omni-abutment and/or assist in retention of the gingival healing cuff.

16. The omni-abutment as recited in claim 6, wherein the gingival healing cuff includes at least one of:

(i) one or more injection ports positioned on mesial and/or distal ends of the gingival healing cuff, for injection or other flow of a composite or other curable material for bonding the gingival healing cuff to the omni-abutment; or (ii) one or more surfaces or anatomical markers of the gingival healing cuff, for injection or other flow of a composite or other curable material for bonding the gingival healing cuff to the omni-abutment.

17. The omni-abutment as recited in claim 16, wherein the gingival healing cuff includes one or more injection ports positioned within a rectangular box or other timing alignment structure, the injection ports being configured for injection or other flow of a composite or other curable material for bonding the gingival healing cuff to the omni-abutment.

18. The omni-abutment as recited in claim 1, further comprising an irregular ovoid transverse cross-section provided along an exterior periphery of the coronal superstructure connection portion of the omni-abutment.

19. The omni-abutment as recited in claim 18, wherein the irregular ovoid transverse cross-section includes relatively shorter buccal and lingual faces, and relatively longer mesial and distal faces, wherein the mesial and distal faces include a truncated flattened exterior surface to accommodate use of the omni-abutment in all tooth positions, including a smallest of lower incisor tooth positions of a given patient.

20. The omni-abutment as recited in claim 18, wherein the platform and collar between the apical connection portion and the coronal superstructure connection portion are anatomically shaped, generally ovoid shaped, or generally circular in shape.

21. The omni-abutment as recited in claim 18, further comprising one or more alignment indents or one or more alignment protrusions in a coronal top surface of the platform configured for use in CT or other scanning, or for use in verification of rotational timing, implant position, and/or identification of an employed implant system.

22. The omni-abutment as recited in claim 18, wherein the omni-abutment includes a central axial hollow portion or channel, wherein the hollow portion or channel includes tri-lobe grooves as at least a part of the tri-lobe interior structure within a coronal superstructure connection portion of the omni-abutment, for mating with a correspondingly shaped scanning body, impression post, torque wrench, percussion insert or other insert.

23. The omni-abutment as recited in claim 18, wherein the coronal superstructure connection portion of the omni-abutment includes one or more recessed portions in an exterior periphery of the omni-abutment, for reception of a composite or other curable material for adhering the omni-abutment to an associated gingival healing cuff, or to provide a recognizable orientation marker during scanning.

24. The omni-abutment as recited in claim 23, wherein the recessed portions include one or more divots, and/or run both axially and longitudinally around the exterior periphery of the coronal superstructure connection portion of the omni-abutment.

25. The omni-abutment as recited in claim 24, wherein the recessed portions include one or more divots, wherein the divots include or are formed to a provide a marker with increased visibility during scanning.

26. The omni-abutment as recited in claim 24, wherein the recessed portions include one or more divots, the divots being configured as circles, triangles, boxes, or other shapes.

27. The omni-abutment as recited in claim 26, wherein the divots include a combination of different shapes, positioned so as to further aid in verifying orientation when scanning.

28. The omni-abutment as recited in claim 18, wherein the apical connection portion comprises at least one of a hex connection or any other keyed engaging connection, or a non-engaging connection at the apical connection portion.

29. The omni-abutment as recited in claim 18, further comprising internal threads within a central axial hollow portion or channel of the omni-abutment, for threaded attachment of a scanning body, impression post, torque wrench, percussion insert, or other insert.

30. A system including the omni-abutment as recited in claim 18, for use with a dental implant, wherein the system further includes a scanning body insert, impression post insert, torque wrench insert, percussion insert, or other insert, which insert directly or indirectly couples into a dental implant underlying the omni-abutment, through the omni-abutment, which insert may screw down into the implant, either after removal of a relatively short retention screw, which may be replaced with a longer retention screw.

31. A system including the omni-abutment as recited in claim 30, further comprising a détente, retention groove or other engagement structure within the omni-abutment for retaining the insert within the omni-abutment.

32. A system including the omni-abutment as recited in claim 18, further comprising one or more grooves or recesses (122) or other markers within an exterior surface of the platform and/or collar configured to assist in verification of seating of the omni-abutment into the corresponding implant, orientation of the omni-abutment with the implant, determining orientation within a scan of the omni-abutment, and/or verification of seating of a corresponding gingival healing cuff relative to the omni-abutment.

33. The omni-abutment as recited in claim 18, wherein the apical connection portion includes an engaging or other configuration that allows it to be scanned in a way that a practitioner can determine orientation of the omni-abutment with certainty, relative to surrounding oral anatomical structure and the corresponding implant, for use of such in fabrication of a prosthesis.

34. The omni-abutment as recited in claim 18, wherein the apical connection portion includes a non-engaging circular configuration or other non-engaging configuration.

35. The omni-abutment as recited in claim 18, wherein the omni-abutment is adapted to be used to support a provisional or final prosthesis.

36. The omni-abutment as recited in claim 18, wherein the omni-abutment can be adjusted by a practitioner as to its height.

37. The omni-abutment as recited in claim 18, wherein the omni-abutment is adapted to be horizontally adjusted by a practitioner.

38. The omni-abutment as recited in claim 18, wherein the coronal superstructure connection portion and the apical connection portion are one homogenous single piece of material, or are two or more pieces, formed of different biocompatible materials.

39. The omni-abutment as recited in claim 1, wherein the omni-abutment is straight, such that the apical connection portion and the coronal superstructure connection portion are oriented so as to share a same longitudinal axis of the omni-abutment.

40. The omni-abutment as recited in claim 1, wherein the omni-abutment is angled, such that the apical connection portion defines a longitudinal axis that differs from a longitudinal axis of the coronal superstructure connection portion.

41. The omni-abutment as recited in claim 1, wherein the platform marker (i) assists in verification of correct seating of a gingival healing cuff on the platform; (ii) aids in scanning; (iii) provides additional retention to a gingival healing cuff, and/or (iv) allows for identification of an implant system specific to the omni-abutment being used.

42. The omni-abutment as recited in claim 1, wherein the omni-abutment further comprises vertical and/or horizontal grooves, and/or round, circular, or other shaped indentations on or within the coronal superstructure connection portion, to aid in retention of a gingival healing cuff, as well as provide additional irregularities for scanning, to better determine orientation, and allow for identification of an implant system specific to the omni-abutment being used.

43. The omni-abutment as recited in claim 1, wherein an inner surface of the coronal superstructure connection portion is internally threaded to allow for increased secure seating of one or more of a scanning body, an impression post or analog, a torque wrench, a percussion insert, or other insert.

44. The omni-abutment as recited in claim 1, wherein a scanning body, an impression post or analog, a torque wrench, a percussion insert, or other insert may be secured into a threading or other connection of the corresponding implant, after removal of a retaining screw coupling the omni-abutment into the corresponding implant.

45. The omni-abutment as recited in claim 1, wherein the tri-lobe interior structure of the coronal superstructure connection portion includes one or more retention grooves to assist in secure seating and verification of seating of mating portions of a coronal scanning body or other insert inserted into the coronal superstructure connection portion, optionally further comprising a détente mechanism provided where inserting structure includes a mating protrusion, which is retained within the one or more retention grooves, further optionally providing means for releasing the détente mechanism to allow, removal of the inserted structure, once it is no longer needed.

46. The omni-abutment as recited in claim 1, further comprising an insert receivable into the coronal superstructure connection portion, where such insert is configured to support a permanent or temporary prosthesis thereon.

47. The omni-abutment as recited in claim 1, wherein a hollow axial channel extends through an entire length of the omni-abutment, allowing insertion of a retention screw used to attach the apical connection portion into a corresponding dental implant that underlies the omni-abutment.

48. An omni-abutment comprising:

(i) an apical connection portion that is configured to mate and/or attach with a receiving portion on a corresponding implant;

(ii) a coronal superstructure connection portion serving as a core that is connected to the apical connection portion; and wherein at least the coronal superstructure connection portion of the omni-abutment includes a tri-lobe interior structure and a tri-lobe exterior structure, wherein the omni-abutment includes a platform and a collar between the apical connection portion and the coronal superstructure connection portion, the collar including a generally frustoconical shape with a frustum of the generally frustoconical shape tapering from a top surface of the platform towards the apical connection portion.

49. The omni-abutment as recited in claim 48, wherein the platform and/or collar are circular, oval, or anatomical in shape.

50. The omni-abutment as recited in claim 49, further comprising one or more protruding, indented or other platform markers.

* * * * *